United States Patent
Ho et al.

(10) Patent No.: US 12,346,082 B2
(45) Date of Patent: Jul. 1, 2025

(54) CONFIGURATION AND CONTROL OF LOAD CONTROL SYSTEMS

(71) Applicant: Lutron Technology Company LLC, Coopersburg, PA (US)

(72) Inventors: Horace C. Ho, Austin, TX (US); Grant Oesterling, Austin, TX (US); Kenneth Priester, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/727,413

(22) Filed: Apr. 22, 2022

(65) Prior Publication Data

US 2022/0342373 A1    Oct. 27, 2022

Related U.S. Application Data

(60) Provisional application No. 63/178,496, filed on Apr. 22, 2021.

(51) Int. Cl.
*G05B 19/05*    (2006.01)

(52) U.S. Cl.
CPC ......... *G05B 19/054* (2013.01); *G05B 19/052* (2013.01)

(58) Field of Classification Search
CPC .. G05B 19/054; G05B 19/052; H05B 47/155; H05B 47/19; H05B 47/1985; H05B 47/1965; H05B 47/1975; H05B 47/199; H05B 47/196
See application file for complete search history.

(56) References Cited

U.S. PATENT DOCUMENTS

| | | | |
|---|---|---|---|
| 5,248,919 A | 9/1993 | Hanna et al. | |
| 5,905,442 A | 5/1999 | Mosebrook et al. | |
| 8,009,042 B2 | 8/2011 | Steiner et al. | |
| 8,228,163 B2 | 7/2012 | Cash et al. | |
| 8,330,638 B2 | 12/2012 | Altonen et al. | |
| 8,417,388 B2 | 4/2013 | Altonen et al. | |

(Continued)

FOREIGN PATENT DOCUMENTS

| | | |
|---|---|---|
| CN | 104471898 A | 3/2015 |
| CN | 105122946 A | 12/2015 |

(Continued)

*Primary Examiner* — Kamini S Shah
*Assistant Examiner* — Mohammed Shafayet
(74) *Attorney, Agent, or Firm* — Flaster Greenberg PC

(57) ABSTRACT

The computing device may be configured to automatically determine curated configuration settings for a scene that is configured to control one or more zones. Each of the zones may be assigned a respective zone purpose. Each zone may be assigned at least one load control device that is configured to control a corresponding electrical load. Each of the one or more zones may be assigned a control type, which may be based on a respective product type and/or load type of the load control devices/electrical loads within each zone. The computing device may be configured to display one or more graphical user interfaces that a user of the computing device may interact with to select a curated configuration option for configuring the scene. The computing device may be configured to automatically determine curated configuration setting for the scene based on the selected curated configuration option and/or the zone purpose.

25 Claims, 14 Drawing Sheets

(56) References Cited

U.S. PATENT DOCUMENTS

| | | |
|---|---|---|
| 8,451,116 B2 | 5/2013 | Steiner et al. |
| 8,521,035 B2 | 8/2013 | Knapp et al. |
| 8,950,461 B2 | 2/2015 | Ogden et al. |
| 9,488,000 B2 | 11/2016 | Kirby et al. |
| 9,655,215 B1 | 5/2017 | Ho et al. |
| 9,674,917 B1 | 6/2017 | Sooch et al. |
| 9,930,742 B1 | 3/2018 | Sooch et al. |
| 10,027,127 B2 | 7/2018 | Crafts et al. |
| 10,237,945 B2 | 3/2019 | Sooch et al. |
| 10,264,651 B2 | 4/2019 | Steiner |
| 10,582,596 B2 | 3/2020 | Sooch et al. |
| 10,621,836 B2 | 4/2020 | Sooch et al. |
| 10,826,697 B2 | 11/2020 | Bard et al. |
| 11,375,598 B2 | 6/2022 | Lark et al. |
| 11,497,100 B2 | 11/2022 | Bard et al. |
| 2002/0152298 A1 | 10/2002 | Kikta et al. |
| 2008/0092075 A1 | 4/2008 | Jacob et al. |
| 2009/0206983 A1 | 8/2009 | Knode et al. |
| 2010/0141153 A1 | 6/2010 | Recker et al. |
| 2012/0026726 A1 | 2/2012 | Recker et al. |
| 2012/0248210 A1 | 10/2012 | Warren et al. |
| 2013/0030589 A1 | 1/2013 | Pessina et al. |
| 2014/0001977 A1 | 1/2014 | Zacharchuk et al. |
| 2014/0070706 A1* | 3/2014 | Fushimi ............... H05B 47/10 315/131 |
| 2014/0132475 A1 | 5/2014 | Bhutani et al. |
| 2014/0265568 A1 | 9/2014 | Crafts et al. |
| 2015/0015165 A1* | 1/2015 | Engelen ............... H04W 4/80 315/294 |
| 2015/0185752 A1 | 7/2015 | Riedl et al. |
| 2015/0201480 A1* | 7/2015 | Ogawa ............... H05B 47/195 315/294 |
| 2015/0253364 A1 | 9/2015 | Hieda et al. |
| 2016/0070244 A1* | 3/2016 | Cipollo ............... G05B 15/02 700/275 |
| 2016/0085431 A1* | 3/2016 | Kim ............... H05B 47/10 715/735 |
| 2016/0170389 A1 | 6/2016 | Im et al. |
| 2016/0174146 A1 | 6/2016 | Wang et al. |
| 2016/0284207 A1 | 9/2016 | Hou et al. |
| 2017/0209338 A1 | 7/2017 | Potucek et al. |
| 2017/0234562 A1 | 8/2017 | Ribbich et al. |
| 2017/0235470 A1 | 8/2017 | Baluja et al. |
| 2017/0265285 A1* | 9/2017 | Ueno ............... G06F 3/04817 |
| 2018/0092187 A1* | 3/2018 | Hidaka ............... H05B 45/20 |
| 2018/0167547 A1 | 6/2018 | Casey |
| 2019/0215927 A1 | 7/2019 | Sooch et al. |
| 2020/0281058 A1 | 9/2020 | Sooch et al. |
| 2020/0374996 A1 | 11/2020 | Barnes et al. |

FOREIGN PATENT DOCUMENTS

| | | |
|---|---|---|
| CN | 106416429 A | 2/2017 |
| CN | 106471553 A | 3/2017 |

\* cited by examiner

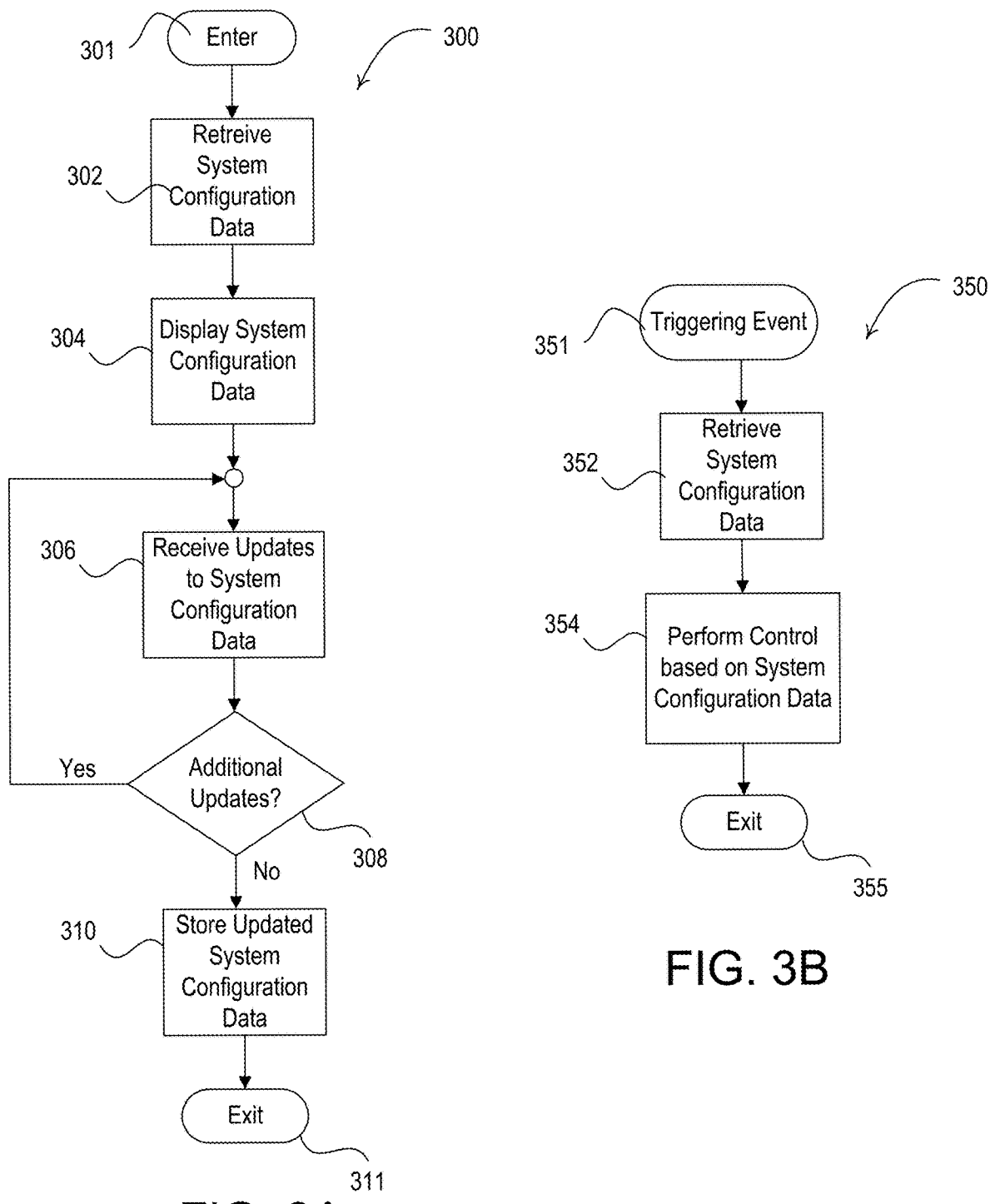

| Area Name | Zone Name | Zone Purpose | Zone Desc | Load# | Fixture Type | Product Type | Load Type |
|---|---|---|---|---|---|---|---|
| Kitchen | Downlights | Ambient | | 1 | | DALI | LED 0-10V (Intensity, Color) |
| | Linears | Accent | | 1 | | N3 Controller | LED Advanced (Intensity, Color, Vibrancy) |
| | Chandelier | Ambient | | 1 | | Dimmer | Dimmable lamps (Intensity) |
| | Downlights | Accent | | 1 | | S30 RF lamp | LED Advanced (Intensity, Color, Vibrancy) |
| | Linears | Task | Near table | 1 | | DALI | LED 0-10V (Intensity, Color) |
| | | | | 2 | | DALI | LED 0-10V (Intensity, Color) |
| | Pendants | Task | | 1 | | A20 RF lamp | LED Advanced (Intensity, Color, Vibrancy) |
| Living Room | Downlights | Ambient | | 1 | | DALI | LED 0-10V (Intensity, Color) |
| | Linears | Accent | | 1 | | N3 Controller | LED Advanced (Intensity, Color, Vibrancy) |
| | Chandelier | Ambient | | 1 | | Dimmer | Dimmable lamps (Intensity) |
| | Downlights | Accent | | 1 | | S30 RF lamp | LED Advanced (Intensity, Color, Vibrancy) |
| | Linears | Task | Near table | 1 | | DALI | LED 0-10V (Intensity, Color) |
| | Linears | Task | Near counter | 1 | | DALI | LED 0-10V (Intensity, Color) |
| | Pendants | Task | | 1 | | A20 RF lamp | LED Advanced (Intensity, Color, Vibrancy) |

FIG. 3D

CONFIGURATION AND CONTROL OF LOAD CONTROL SYSTEMS

CROSS-REFERENCE TO RELATED APPLICATIONS

This application claims the benefit of U.S. Provisional Patent Application No. 63/178,496, filed Apr. 22, 2021, the disclosure of which is incorporated herein by reference in its entirety.

BACKGROUND

A user environment, such as a residence, an office building, or a hotel for example, may be configured to include various types of load control systems. For example, a lighting control system may be used to control the lighting loads in the user environment. A motorized window treatment control system may be used to control the natural light provided to the user environment. A heating, ventilating, and air conditioning (HVAC) system may be used to control the temperature in the user environment.

SUMMARY

A computing device may be configured to define and/or update scenes for controlling one or more zones in a certain area of a load control system. For example, the load control system may be installed in a residential home or commercial building. At least one electrical load and/or a load control device that is configured to control the corresponding electrical load may be assigned to each of the one or more zones in system configuration data that is used to identify the devices and/or the operation thereof in the load control system. For example, the at least one electrical load may comprise a lighting load and the load control device may comprise a lighting control device, which are associated with one another in the system configuration data for enabling load control.

A control/configuration application on the computing device may be configured to display one or more graphical user interfaces that a user of the computing device may interact with to define and/or update the scenes. The graphical user interface may display one or more zones defined in an area of devices and that are associated in the system configuration data for collective control. For example, the devices in the load control system may be grouped or organized together based on their respective area within the user environment. The user may interact with the graphical user interface to configure the control settings for each of the zones in the respective areas.

The graphical user interface may include a curated configuration option for automatically defining curated configuration settings for one or more zones in an area. The control/configuration application executing on the computing device to display the graphical user interface may receive a selection of one of multiple a curated configuration option for generating the curated configuration settings for the zones. In response to the selection of a curated configuration option, the control/configuration application may identify a control type for the lighting loads and/or lighting control devices in each of the zones. For example, the control/configuration application may access a predefined dataset of control types for different types of lighting loads and/or lighting control devices in each zone in the area. Different types of electrical loads and/or load control devices may be grouped in the dataset according to a respective control type. The different control types may group together lighting loads and/or lighting control devices with similar lighting control features and/or commands that may be transmitted for performing control of similar features of the lighting loads and/or lighting control devices of a given control type.

After the control type is identified by the control/configuration application for each of the zones in the area, the control/configuration application may automatically configure control settings for each zone in the area based on the identified control type. Each a curated configuration option may have curated configuration settings that correspond to each control type for a given zone purpose. The control/configuration application may update the system configuration data to include the defined scene by storing the automatically determined curated configuration settings for controlling the zones in the scene in response to the triggering event for the scene. After generating the system configuration data and/or updating the system configuration data, the control/configuration application may transmit the system configuration data (e.g., or any updates) to other devices in the load control system for enabling load control based on the system configuration data. In response to a triggering event for enabling the defined scene, one or more devices may perform control based on the configuration settings defined in the scene stored in the system configuration data.

The graphical user interface that is generated by the control/configuration application may allow the user to manually update the curated configuration settings for the zones in a scene and/or a preset. For example, the user may select a curated configuration option and the control/configuration application may populate the graphical user interface with the curated configuration settings for the selected a curated configuration option. The user may then manually update the curated configuration settings before storing the curated configuration settings in the system configuration data for performing control of the devices in the load control environment.

The techniques described herein may be used to automatically determine curated configuration settings for controlling one or more zones in response to a scene being triggered (e.g., by a triggering event, such as a button press) via the control/configuration application. During configuration, each of the one or more zones may be assigned a respective zone purpose. The scene for controlling the one or more zones may be configured/defined via the control/configuration application. For example, a user configuring the scene may select a curated configuration option from a set of curated configuration options via the control/configuration application. Based on the selected curation configuration option, the control/configuration application may automatically determine curated configuration settings for the scene. The curated configuration settings may also be automatically determined based on the assigned zone purpose. The automatically determined curated configuration setting may be transmitted and/or received by one or more load control devices that are associated with one or more zones. For example, the one or more load control devices may be configured to receive an indication of the triggering event for enabling the scene, and, in response, control the one or more zones according to the automatically determined curated configuration settings. The curated configuration settings automatically determined by the control/configuration application may provide values to one or more control parameters for each of the one or more zones. For example, the control/configuration application may determine the available control parameters for each of the devices in the one or more zones based on a control type associated with a respective zone. Each of the one or more may be associated with a respective control type, which may be determined based on a product type and/or load type of the devices within that zone. Accordingly, the curated configurated setting may include values for each of the available control parameters for the devices in the zone.

The above advantages and features are of representative embodiments only. They are not to be considered limitations. Additional features and advantages of embodiments will become apparent in the following description, from the drawings, and from the claims.

BRIEF DESCRIPTION OF THE DRAWINGS

FIGS. 3A-3B are flowcharts depicting example procedures for configuring and/or controlling a load control system.

FIG. 3D illustrates an example graphical user interface that may be displayed by a control/configuration application to display and/or update the system configuration data for a load control system.

DETAILED DESCRIPTION

Figure 1:
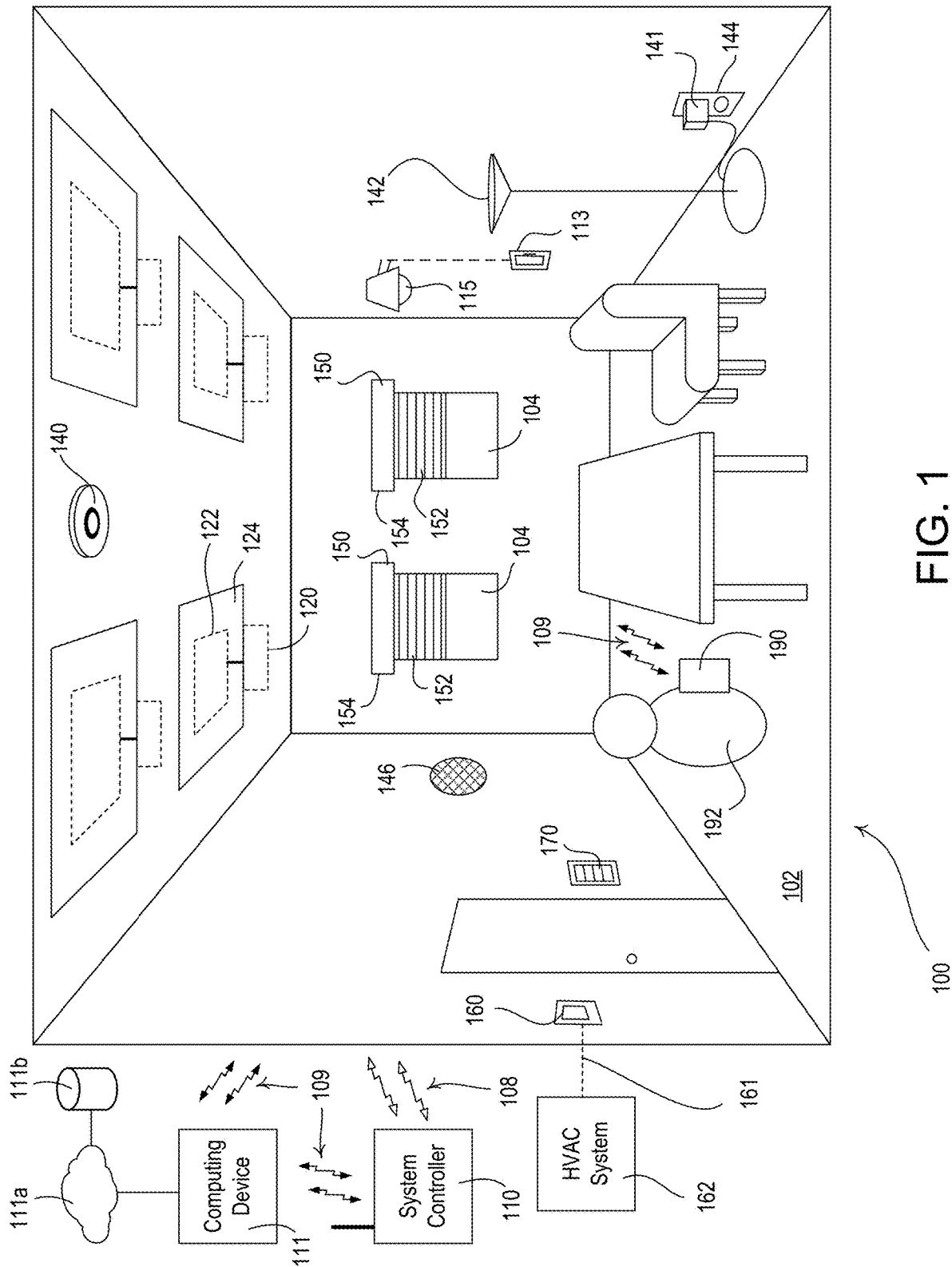
FIG. 1 is a diagram of an example load control system.

FIG. 1 is a diagram of an example load control system 100 for controlling the amount of power delivered from a power source, such as an alternating-current (AC) power source (not shown), to one or more electrical loads. The load control system 100 may be installed in a user environment 102. The user environment 102 may include a space in a residential or commercial building. For example, the load control system 100 may be installed in one or more rooms on one or more floors in the building.

The load control system 100 may comprise a plurality of load control devices installed throughout the user environment 102. The load control devices are configured to control one or more electrical loads in the user environment 102 (also referred to as a load control environment). For example, the load control devices may control the one or more electrical loads in response to input from a user 192, input from one or more input devices or other devices in the load control system 100, and/or preprogrammed settings on the load control devices.

The load control devices in the load control system 100 may include lighting control devices, such as lighting control devices 120. The lighting control devices 120 may be configured to control a respective lighting load 122 installed in a lighting fixture 124. For example, the lighting control devices 120 may comprise light-emitting diode (LED) drivers and the lighting loads 122 may comprise LED light sources. While each lighting fixture 124 is shown having a single lighting load 122, each lighting fixture may comprise one or more individual light sources (e.g., lamps and/or LED emitters) that may be controlled individually and/or in unison by the respective lighting control device. Though described as an LED driver, the lighting control device 120 may be a dimmer, an electronic switch, a ballast, or another type of lighting control device configured to control one or more lighting loads 122. The lighting control device 120 may be configured to directly control an amount of power provided to the lighting load 122. The lighting control device 120 may be configured to receive (e.g., via wired or wireless communications) messages via signals 108,109, and to control the lighting load 122 in response to the received messages. One will recognize that lighting control device 120 and lighting load 122 may be integral and thus part of the same fixture or bulb, for example, or may be separate.

The load control devices in the load control system 100 may include other lighting control devices, such as lighting control device 113. Lighting control device 113 may be a wall-mounted dimmer, a wall-mounted switch, or other keypad device for controlling a lighting load(s), such as lighting load 115. The lighting control device 113 may be adapted to be mounted in a standard electrical wall box. The lighting control device 113 may include one or more buttons for controlling the lighting load 115. The lighting control device 113 may include a toggle actuator. Actuations (e.g., successive actuations) of the toggle actuator may toggle (e.g., turn off and on) the lighting load 115. The lighting control device 113 may include an intensity adjustment actuator (e.g., a rocker switch or intensity adjustment buttons). Actuations of an upper portion or a lower portion of the intensity adjustment actuator may respectively increase or decrease the amount of power delivered to the lighting load 115 and thus increase or decrease the intensity of the receptive lighting load from a minimum intensity (e.g., approximately 1%) to a maximum intensity (e.g., approximately 100%). The lighting control device 113 may include a plurality (two or more) of visual indicators, e.g., light-emitting diodes (LEDs), which may be arranged in a linear array and that may illuminate to provide feedback of the intensity of the lighting load 115.

As described herein, a lighting control device, such as the lighting control devices 113 and/or 120 may control a lighting load (e.g., or a plurality of lighting loads), such as the respective lighting loads 115 and 122, where the lighting load may include a plurality of multi-colored LEDs (light emitting diodes). In other words, the lighting loads 115, 122 may include within a single package, for example, a number of differently colored emission LEDs and may be configured such that the chromaticity output of the LEDs is mixed to produce light having varying chromaticity coordinates (e.g., color points) within a color gamut formed by the various LEDs that make up the lighting load. As one example, the lighting loads 115, 122 may include one or more red LEDs, one or more green LEDs, one or more blue LEDs, and one or more white LEDs (which may be collectively referred to herein as an RGBW lighting load and/or LED Advanced). White LEDs may comprise substantially white LEDs (e.g., such as yellow and/or mint green LED(s)). Although the RGBW lighting load is described herein with a combination of four LEDs of certain colors, other combinations of LEDs (e.g., more or less LEDs and/or different color LEDs) may be used.

The lighting control device 113, 120 may adjust various settings of one or more control parameters of the corresponding lighting load 115, 122 to adjust the light emitted from the lighting load 115, 122. For example, the lighting control device may adjust a lighting intensity level (e.g., a brightness), a color (e.g., a correlated color temperature (CCT) value or a full color value), a value of a vibrancy parameter affecting color saturation, etc., which are further described herein. Further, the lighting control device 113, 120 may adjust the settings of lighting load(s) over time (which may be referred to as natural show or natural lighting). For example, the lighting control devices 113, 120 may adjust the settings of the lighting loads 115, 122 over time to emulate a sunrise and/or sunset, which may be based on the local time of sunrise and/or sunset for the load control system 100 and the user environment 102.

Each lighting control device 113, 120 and respective lighting load 115, 122 may be configured to produce white or near-white light of varying brightness/intensities within a range of correlated color temperatures ranging from "warm white" (e.g., approximately 2600 Kelvin (K)-3700 K), to "neutral white" (e.g., approximately 3700 K-5000 K) to "cool white" (e.g., approximately 5000 K-8300 K). For example, the lighting control device 113, 120 and the respective lighting load 115, 122 may be configured to produce light of varying chromaticity coordinates that lie along the black body locus. As a further example, each lighting control device 113, 120 and its respective lighting load 115, 122 may be further configured to produce any of a plurality of colors of varying light intensity values within the color gamut formed by the various LEDs that make up the lighting load 115, 122.

Each lighting control device 113, 120 and its respective lighting load 115, 122 may be configured to increase and/or decrease a color saturation of objects in the user environment 102. For example, the lighting control devices 113, 120 may control or be responsive to a vibrancy parameter that is configured to control the color saturation of the objects in the user environment 102. The vibrancy parameter may allow the lighting control devices 113, 120 to tune the individual LEDs of different colors that are used to emit light at a given color (e.g., full color or a CCT). The vibrancy parameter may also, or alternatively, allow the lighting control devices 113, 120 to adjust the saturation of emitted light by adjusting the emitted light of each of the LEDs between white and a color (e.g., RGB) of the LED. The vibrancy parameter may cause the lighting control device 113, 120 to control the power provided to the LEDs of the corresponding lighting load 115, 120 to adjust the wavelengths of the light emitted by the lighting load 115, 122, which may affect the color of the light (e.g., the reflected light) on objects within the user environment 102. In addition, as further described herein, adjusting the vibrancy value may adjust the spectral power distribution (SPD) of the emitted light.

Increases and decreases in the value of the vibrancy parameter may increase and/or decrease the color saturation of objects in the area without changing the color of the light when the user 192 looks at the light (e.g., the color of the emitted light). In an example, the vibrancy parameter may be a relative value (e.g., between zero and one-hundred percent) for increasing and/or decreasing the color saturation of the objects in the user environment 102. Changing the relative value of the vibrancy parameter may cause the lighting control devices 113, 120 to decrease and/or increase the intensity level of one or more white LEDs (e.g., white and/or substantially white LEDs) that make up the respective lighting loads 115, 122. For example, increasing the value of the vibrancy parameter may decrease the intensity level of the one or more white LEDs that make up the respective lighting loads 115, 122, and thereby increase the color saturation of the objects in the user environment 102. Decreasing the value of the vibrancy parameter may thereby increase the intensity level of the one or more white LEDs that make up the respective lighting loads 115, 122, and thereby decrease the color saturation of the objects in the user environment 102.

Changing the value of the vibrancy parameter in this manner may also include changing the intensities of other LEDs (e.g., red, green, and/or blue LEDs) of the lighting loads 115, 122 to maintain the same color output of the lighting loads 115, 122 (e.g., to maintain the same chromaticity coordinates (or approximately the same chromaticity coordinates within one or more MacAdam ellipses) of the mixed color output of the lighting loads 115, 122). Adjusting the vibrancy value may, however, adjust the light reflected off of objects in the space. In addition, adjusting the vibrancy value may adjust the spectral power distribution (SPD) of the emitted light. For example, as the vibrancy value increases, the spectral power distribution of the emitted light (e.g., relative intensity vs wavelength) may become sharper (e.g., the SPD of the emitted light may have more peaks) and/or may result in individual colors on the objects to appear more vibrant when the light reflects off of them. One example of a lighting control device and respective lighting load as described above is a luminaire or lamp as provided by LUTRON ELECTRONICS CO., INC. Another example of such a lighting control device and respective lighting load is described as illumination device 38 of U.S. Pat. No. 10,237,945, issued Mar. 19, 2019, entitled ILLUMINATION DEVICE, SYSTEM AND METHOD FOR MANUALLY ADJUSTING AUTOMATED PERIODIC CHANGES IN EMULATION OUTPUT, the contents of which are hereby incorporated by reference in their entirety. One will recognize that other examples lighting control device and respective lighting loads are possible.

A light output of the lighting loads 115, 122 may be measured by a color rendering index (CRI) value. The CRI value may be a measurement of the ability of the lighting load 115, 122 to reveal the actual color of objects as compared to an ideal light source (e.g., natural light). A higher CRI value may be a desirable characteristic of a user. For example, a lighting load with a higher CRI value may provide light such that the objects within a space reflect light at a natural color. With respect to the lighting loads described herein, each of the respective LEDs that are comprised within a RGBW lighting load may be defined by a certain CRI value. In addition, an RGBW lighting load, for example, may itself be defined by a CRI value (e.g., a CRI value that indicates a summary or average CRI of each of the respective LEDs comprised within the lighting load). CRI values may be in the range of 0 to 100, inclusively. For example, the lowest possible CRI quality value may be 0 and the highest possible CRI quality value may be 100. In an auto vibrancy mode as described herein, the control application may be used to configure a CRI value of one or more lighting loads. A CRI value greater than or equal to a threshold CRI value (e.g., a CRI value of 90) may be desirable and may be referred to herein as "optimal", "optimized", or "maximized". That said, other ranges (e.g., smaller and/or larger ranges) may also be considered "optimal", "optimized", or "maximized". In certain instances, the CRI value of a lighting load may be increased to a value greater than or equal to the threshold CRI value. For example, the threshold CRI value may be 90. One will appreciate, however, that the threshold CRI value may be other values. Rather, the CRI threshold value may be a value which may be considered a desirable threshold that a system may attempt to achieve give the certain characteristics of the load control system 100 and/or lighting control devices 113, 120 (e.g., quality of the LEDs used in a lighting load). As described herein, optimizing the CRI value towards or above the threshold CRI value may be referred to as optimizing the CRI value. This feature may be enabled through the auto vibrancy mode.

With regard to other load control devices in the load control system 100, the load control system 100 may comprise one or more daylight control devices, such as motorized window treatments 150. The motorized window treatments 150 may comprise motorized cellular shades, for controlling the amount of daylight entering the user environment 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the user environment 102. The motor drive units of the motorized window treatments 150 may be configured to receive messages via the RF signals 108,109 and adjust the position of the respective window treatment fabric 152 in response to the received messages. The motor drive units of the motorized window treatments 150 may also or alternatively be configured to receive messages via a wired communication link, and adjust the position of the respective window treatment fabric 152 in response to the received messages. The motorized window treatments may be battery-powered or powered by an AC power source. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control devices in the load control system 100 may comprise a plug-in load control device 141 for controlling a plug-in electrical load. The plug-in electrical load may comprise a plug-in lighting load, such as a floor lamp 142 or a table lamp. The plug-in electrical load may comprise an appliance (such as a television or a computer monitor). The floor lamp 142 may be plugged into the plug-in load control device 141 for receiving power and/or enabling control. The plug-in load control device 141 may be plugged into a standard electrical outlet 144 and thus may be coupled in series between the AC power source and the plug-in lighting load. The plug-in load control device 141 may be configured to receive messages via the RF signals 108,109 and to turn on and off or adjust the intensity, color, vibrancy, etc. of the floor lamp 142 in response to the received messages.

The load control devices in the load control system 100 may comprise one or more temperature control devices, such as a thermostat 160, for controlling a temperature in the user environment 102. The thermostat 160 may be coupled to a heating, ventilation, and air conditioning (HVAC) system 162 via a control link 161. The control link 161 may be an analog control link or a wired digital communication link. The thermostat 160 may be configured to wirelessly communicate messages with a controller of the HVAC system 162. The thermostat 160 may comprise a temperature sensor for measuring the room temperature of the user environment 102 and may control the HVAC system 162 to adjust the temperature in the user environment 102 to a setpoint temperature. The load control system 100 may comprise one or more wireless temperature sensors (not shown) located in the user environment 102 for measuring the room temperatures. The HVAC system 162 may be configured to turn a compressor on and off for cooling the user environment 102 and to turn a heating source on and off for heating the user environment 102 in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the user environment 102. The thermostat 160 may be configured to receive messages via the RF signals 108, 109 and adjust heating, ventilation, and cooling in response to the received messages.

The load control devices in the load control system 100 may comprise one or audio/visual control devices or appliances, such as an audio device 146. The audio device 146 may be part of an audio/visual system, such as an intercom system, a speaker system, and/or another audio/visual system that is able to generate audible sounds, such as alarms, music, intercom functionality, etc. The audio device 146 may have at least one microphone and/or at least one speaker, either integrated with the audio device 146, or an external speaker to which the audio device 146 transmits acoustic signals for playback in the user environment 102. The audio device 146 may have a volume adjuster (e.g., one or more buttons) that is accessible for manually adjusting the output volume of the speaker of the audio device 146. As an example, the volume adjuster may include a volume up button and a volume down button, a rotating knob, a capacitive or resistive touch area, or any other suitable volume adjustment. A user may press a button or perform a rotation to increase the volume level of the speaker, and press another button or perform another (e.g., opposing) rotation to decrease the volume level of the speaker. The volume adjuster may adjust the volume of the speaker by increasing or decreasing the amplitude of the speaker output. The audio device 146 may also, or alternatively, increase and decrease the volume level in response to messages received via the RF signals 108, 109.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a motor control unit for controlling a motor load, such as a ceiling fan or an exhaust fan; a drive unit for controlling a motorized window treatment or a projection screen; motorized interior or exterior shutters; an air conditioner; a compressor; an electric baseboard heater controller; a controllable damper; a variable air volume controller; a fresh air intake controller; a ventilation controller; hydraulic valves for use radiators and radiant heating system; a humidity control unit; a humidifier; a dehumidifier; a water heater; a boiler controller; a pool pump; a refrigerator; a freezer; a television or computer monitor; a video camera; an amplifier; an elevator; a power supply; a generator; an electric charger, such as an electric vehicle charger; and an alternative energy controller.

The load control system 100 may comprise one or more input devices capable of receiving an input event for controlling one or more load control devices in the load control system 100. The input devices and the load control devices may be collectively referred to as control devices in the load control system 100. The input devices in the load control system 100 may comprise one or more remote control devices, such as remote control device 170. The remote control device 170 may be battery-powered. The remote control device 170 may be configured to transmit messages via the RF signals 108 to one or more other devices in the load control system 100 in response to an input event, such as an actuation of one or more buttons or a rotation of a rotary knob of the remote control device 170. An input device may also be wired to the system controller 110 and, in response to an input event, the system controller may transmit messages to one or more other devices in the load control system 100. For example, the remote control device 170 may comprise a keypad. In another example, the remote control device 170 may comprise a rotary knob configured to transmit messages via the RF signals 108 to one or more other devices in response to a rotation on the rotary knob (e.g., rotation of a predefined distance or for a predefined period of time). The remote control device 170 may be mounted to a structure, such as a wall, a toggle actuator of a mechanical switch, or a pedestal to be located on a horizontal surface. In another example, the remote control device 170 may be handheld. The remote control device 170 may provide feedback (e.g., visual feedback) to a user of the remote control device 170 on a visual indicator, such as a status indicator. The status indicator may be illuminated by one or more light emitting diodes (LEDs) for providing feedback. The status indicator may provide different types of feedback. The feedback may include feedback indicating actuations by a user or other user interface event, a status of electrical loads being controlled by the remote control device 170, and/or a status of the load control devices being controlled by the remote control device 170. The feedback may be displayed in response to user interface event and/or in response to messages received that indicate the status of load control devices and/or electrical loads. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, the entire disclosure of which is hereby incorporated by reference.

The input devices of the load control system 100 may comprise one or more sensor devices, such as the sensor device 140. The sensor device 140 may be configured to transmit messages via the RF signals 108 to one or more other devices in the load control system 100 in response to an input event, such as a sensor measurement event. The sensor device 140 may also or alternatively be configured to transmit messages via a wired communication link to one or more other devices in the load control system 100 in response to an input event, such as a sensor measurement event. The sensor device 140 may operate as an ambient light sensor or a daylight sensor and may be capable of performing a sensor measurement event by measuring a total light intensity in the space around the sensor device 140. The sensor device 140 may transmit messages including the measured light level or control instructions in response to the measured light level via the RF signals 108. Examples of RF load control systems having daylight sensors are described in greater detail in commonly assigned U.S. Pat. No. 8,451,116, issued May 28, 2013, entitled WIRELESS BATTERY POWERED DAYLIGHT SENSOR, the entire disclosure of which is hereby incorporated by reference.

The sensor device 140 may operate as an occupancy sensor configured to detect occupancy and vacancy conditions in the user environment 102. The sensor device 140 may be capable of performing the sensor measurement event by measuring an occupancy condition or a vacancy condition in response to occupancy or vacancy, respectively, of the user environment 102 by the user 192. For example, the sensor device 140 may comprise an infrared (IR) sensor capable of detecting the occupancy condition or the vacancy condition in response to the presence or absence, respectively, of the user 192. The sensor device 140 may transmit messages including the occupancy conditions or vacancy conditions, or control instructions generated in response to the occupancy/vacancy conditions, via the RF signals 108. Again, the sensor device 140 may also or alternatively transmit messages including the occupancy conditions or vacancy conditions, or control instructions generated in response to the occupancy/vacancy conditions via a wired communication link. Examples of load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING, the entire disclosure of which is hereby incorporated by reference.

The sensor device 140 may operate as a visible light sensor (e.g., including a camera or other device capable of sensing visible light). The sensor device 140 may be capable of performing the sensor measurement event by measuring an amount of visible light within the user environment 102. For example, the sensor device 140 may comprise a visible light sensing circuit having an image recording circuit, such as a camera, and an image processing circuit. The image processing circuit may comprise a digital signal processor (DSP), a microprocessor, a programmable logic device (PLD), a microcontroller, an application specific integrated circuit (ASIC), a field-programmable gate array (FPGA), or any suitable processing device capable of processing images or levels of visible light. The sensor device 140 may be positioned towards the user environment 102 to sense one or more environmental characteristics in the user environment 102. The image recording circuit of the sensor device 140 may be configured to capture or record an image. The image recording circuit of the sensor device 140 may provide the captured image to the image processor. The image processor may be configured to process the image into one or more sensed signals that are representative of the sensed environmental characteristics. The sensed environmental characteristics may be interpreted from the sensed signals by the control circuit of the sensor device 140 or the sensed signals may be transmitted to one or more other devices via the RF signals 108, 109 (e.g., a computing device in the load control environment) for interpreting the sensed environmental characteristics. For example, the sensed environmental characteristics interpreted from the sensed signals may comprise an occurrence of movement, an amount of movement, a direction of movement, a velocity of movement, a counted number of occupants, an occupancy condition, a vacancy condition, a light intensity, a color of visible light, a color temperature of visible light, an amount of direct sunlight penetration, or another environmental characteristic in the user environment 102. In another example, the sensor device 140 may provide a raw image or a processed (e.g., preprocessed) image to one or more other devices (e.g., computing devices) in the load control system 100 for further processing. The sensor device 140 may operate as a color temperature sensor when sensing the color temperature of the visible light. Examples of load control systems having visible light sensors are described in greater detail in commonly-assigned U.S. Pat. No. 10,264,651, issued Apr. 16, 2019, entitled LOAD CONTROL SYSTEM HAVING A VISIBLE LIGHT SENSOR, and U.S. Patent App. Pub. No. 2018/0167547, published Jun. 14, 2018, entitled CONFIGURATION OF A VISIBLE LIGHT SENSOR, the entire disclosures of which are hereby incorporated by reference.

The sensor device 140 may be external to the lighting fixtures 124 (e.g., affixed or attached to a ceiling or a wall of the user environment 102). The sensor device 140 may be positioned towards the user environment 102 and may be capable of performing sensor measurement events in the user environment 102. In one example, the sensor device 140 may be affixed or attached to a window 104 of the user environment 102 and operate as a window sensor that is capable performing sensor measurement events on light that is entering the user environment 102 through the window 104. For example, the sensor device 140 may comprise an ambient light sensor capable of detecting when sunlight is directly shining into the sensor device 140, is reflected onto the sensor device 140, and/or is blocked by external means, such as clouds or a building based on the measured light levels being received by the sensor device 140 from outside the window. The sensor device 140 may send messages indicating the measured light level. Though illustrated as being external to the lighting fixtures 124, one or more sensor devices 140 may be mounted to one or more of the lighting fixtures 124 (e.g., on a lower or outward-facing surface of the lighting fixture 124). For example, one or more sensor devices 140 may be electrically coupled to a control circuit or a load control circuit of the load control devices 120 for performing control in response to the sensor measurement events of the sensor devices 140.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential controllers, commercial controllers, industrial controllers, and/or another type of input device.

The input devices and the load control devices may be configured to communicate messages between one another on a communication link within the load control system. For example, the input devices and the load control devices may be capable of communicating messages directly to one another via the RF signals 108. The RF signals 108 may be transmitted using a proprietary RF protocol, such as the CLEAR CONNECT protocol (e.g., CLEAR CONNECT TYPE A and/or CLEAR CONNECT TYPE X protocols). Alternatively, the RF signals 108 may be transmitted using a different RF protocol, such as, a standard protocol, for example, one of WIFI, cellular (e.g., 3G, 4G LTE, 5G NR, or any other cellular protocol), BLUETOOTH, BLUETOOTH LOW ENERGY (BLE), ZIGBEE, Z-WAVE, THREAD, KNX-RF, ENOCEAN RADIO protocols, or a different proprietary protocol. In an example, the input devices may transmit messages to the load control devices via the RF signals 108 that comprise input events (e.g., button presses, sensor measurement events, or other input event) or control instructions generated in response to the input events for performing control of the electrical loads controlled by the load control devices. Though communication links may be described as a wireless communication links, wired communication links may similarly be implemented for enabling communications herein.

For devices in the load control system 100 to recognize messages directed to the device and/or to which to be responsive, the devices may be associated with one another by performing an association procedure. For example, for a load control device to be responsive to messages from an input device, the input device may first be associated with the load control device. As one example of an association procedure, devices may be put in an association mode for sharing a unique identifier for being associated with and/or stored at other devices in the load control system 100. For example, an input device and a load control device may be put in an association mode by the user 192 actuating a button on the input device and/or the load control device. The actuation of the button on the input device and/or the load control device may place the input device and/or the load control device in the association mode for being associated with one another. In the association mode, the input device may transmit an association message(s) to the load control device (directly or through one or more other devices as described herein). The association message from the input device may include a unique identifier of the input device. The load control device may locally store the unique identifier of the input device in association information, such that the load control device may be capable of recognizing messages (e.g., subsequent messages) from the input device that may include load control instructions or commands. The association information stored at the load control device may include the unique identifiers of the devices with which the load control device is associated. The load control device may be configured to respond to the messages from the associated input device by controlling a corresponding electrical load according to the load control instructions received in the messages. The input device may also store the unique identifier of the load control device with which it is being associated in association information stored locally thereon. A similar association procedure may be performed between other devices in the load control system 100 to enable each device to perform communication of messages with associated devices. This is merely one example of how devices may communicate and be associated with one another and other examples are possible.

According to another example, one or more devices may receive system configuration data (e.g., or subsequent updates to the system configuration data) that is uploaded to the devices and that specifies the association information comprising the unique identifiers of the devices being associated. The system configuration data may comprise a load control dataset that defines the devices and operational settings of the load control system 100. The system configuration data may include information about the devices in the user environment 102 and/or the load control system 100. The system configuration data may include association information that indicates defined associations between devices in the load control system. The association information may be updated using any of the association procedures described herein.

The system configuration data may be generated during configuration of the load control system 100 for controlling the devices therein. The system configuration data may include characteristics and/or identifiers of the devices stored therein. For example, the system configuration data may include a unique identifier, such as a serial number or other unique identifier, of the devices in the load control system 100. The unique identifier may be used to identify the device and/or for communicating with the device in the load control system.

The system configuration data may include a product type for one or more of the devices identified therein. The product type may be a type of load control device capable of controlling an electrical load, such as a lighting control device capable of controlling a lighting load. Also, or alternatively, the product type may indicate the device that is configured to control the corresponding load control device. For example, the product type may include a switch, a dimmer, a 0-10 Volt (V) controller, a DALI module, an N3 controller, an S30 radio frequency (RF) lamp, an A20 RF lamp, or another lighting product type capable of performing lighting control. The product type may also, or alternatively, identify product types of other control devices in the load control system 100, such as for the system controller 110, input devices (e.g., sensor device 140 and/or remote control device 170), the motorized window treatments 150, audio/visual devices (e.g., the speaker device 146), the temperature control device 160, the HVAC system, 160, the plug-in load control device 141, the floor lamp 142 or a table lamp, the user device 190, and/or the product type of other devices in the load control system 100.

The system configuration data may include a load type for one or more of the devices identified therein. The load type may be a type of electrical load, such as a lighting load, motorized window treatment, and/or an electric motor, capable of being controlled by a load control device. For example, the load type may include a lighting load type, such as an LED lamp, a fluorescent lamp, or another lighting load type. The load type may include additional characteristics of the lighting load, such as the voltage (e.g., 0-10V) characteristics, for example. The load type may also, or alternatively, indicate the types of control a given load control device is able to perform. Referring to a lighting control device, for example, the load type may indicate whether the lighting control device is able to control the intensity, color (e.g., color temperature, full color, etc.), vibrancy, etc. In certain implementations, the load type may be automatically determined based on the product type. For example, a user may define/assign a product type to each of the devices in a load control system, and, based on the product type, a corresponding load type may be determined/assigned to each of the devices in the load control system. When the lighting control device and/or lighting load are installed in a fixture, the system configuration information may also include a fixture type. As described herein, the fixture type may indicate/identify the particular model of the respective lighting fixture, and the model may be associated with respective information that indicates the size and number/type of lighting loads that can be installed in the fixture.

As described herein, the product type, load type, and/or fixture type may be defined for each load control device (e.g., by a user), and this information may be used to control each of load control device.

A control type may be defined by the product type, the load type, and/or the combination of the product type and load type of a specific zone. For example, the control type may define the one or more control parameters of the load control devices and/or lighting loads of the zone that are also capable of being controlled. The control type may be separately defined in the system configuration data, or may be indicated by or inferred from the product type and/or load type. The control type may be identified by a unique identifier. The control type may also, or alternatively, be indicated by and/or determined from a manufacturer identifier. In one example, the control type of a lighting device may indicate that the lighting device may be capable of performing full-color lighting control, color temperature lighting control, vibrancy control, dimmable lighting control (e.g., intensity control), switched lighting control (e.g., on/off control), and/or another type of lighting control. The control type may indicate the lighting control devices and/or lighting loads that are capable of receiving one or more parameters in lighting control commands for enabling a similar type of control of the lighting loads (similar control parameters and/or values for each parameter).

The control type may be defined by and/or associated with one or more control parameters capable of being set to values for controlling the load. The control parameters may be stored with the control type in the system configuration data, or the control parameters may be separately stored in the system configuration data. For example, the control type for a lighting control device may indicate the lighting control capabilities using one or more control parameters. For example, the control parameters may include a full-color lighting control parameter configured to enable full-color lighting control, a color temperature lighting control parameter configured to enable color temperature lighting control (e.g., correlated color temperature lighting control), a vibrancy parameter configured to enable vibrancy control, an intensity parameter configured to enable dimmable lighting control (e.g., intensity control), an on/off parameter configured to enable switched lighting control (e.g., on/off control), and/or other control parameters for enabling other lighting control features. The respective control parameters for a given lighting control device/lighting load may be based on the control type.

The product type and/or the load type may be assigned to one or more zones in the load control system 100. The zones may be defined in the system configuration data by a zone name and/or another zone identifier. The system configuration data may include a zone description that identifies a location or other descriptive characteristics of the zone. The system configuration information may indicate a number of loads and/or load control devices that are assigned to the one or more zones. The zones may be assigned to different areas within the load control system 100. The areas may be defined in the system configuration data by an area name and/or another area identifier with which one or more of the zones may be associated.

The zones may be assigned a zone purpose. For example, lighting zone purposes may indicate purposes of the corresponding lighting control device and/or lighting load in a lighting zone, such as ambient lighting, accent lighting, task lighting, or another lighting purpose for a lighting zone. The lighting zone purpose may define the function (e.g., intended function) of the lighting control device(s) and/or lighting load(s) assigned to the lighting zone.

The system configuration data may comprise a scene configuration for controlling a scene. The system configuration data may include one or more defined scenes, and/or a scene configuration, for controlling the devices assigned to the zones. The scene configuration may include curated configuration settings, as described herein.

One or more portions of the system configuration data may be distributed across devices in the load control system 100. For example, one or more devices (e.g., intermediary devices) may maintain association information that includes the unique identifiers that make up the associations of other devices in the load control system 100. For example, the input devices and the load control devices may communicate on a communication link in the load control system 100 through one or more other intermediary devices, such as router devices or other devices in a network. The intermediary devices may comprise input devices, load control devices, a central processing device, or another intermediary device capable of enabling communication between devices in the load control system. The association information that is maintained on the intermediary devices may comprise the unique identifiers of the devices that are associated with one another for identifying and/or enabling communication of messages between devices in the load control system 100. For example, an intermediary device may identify the unique identifiers being transmitted in association messages between devices during the association procedure and store the unique identifiers of the devices as an association in the association information. The intermediary devices may use the association information for monitoring and/or routing communications on a communication link between devices in the load control system 100. In another example, the association information of other devices may be uploaded to the intermediary device and/or communicated from the intermediary device to the other devices for being locally stored thereon (e.g., at the input devices and/or load control devices).

The load control system 100 may comprise a system controller 110. The system controller 100 may operate as an intermediary device, as described herein. For example, the system controller 110 may operate as a central processing device for one or more other devices in the load control system 100. The system controller 110 may be operable to communicate messages to and from the control devices (e.g., the input devices and the load control devices). For example, the system controller 110 may be configured to receive messages from the input devices and transmit messages to the load control devices in response to the messages received from the input devices. The system controller 110 may route the messages based on the association information stored thereon. The input devices, the load control devices, and the system controller 110 may be configured to transmit and receive the RF signals 108 and/or over wired communication link.

The system controller 110 may receive information in messages from devices in the load control system 100 (e.g., inputs from input devices) via the RF signals 108 and generate corresponding control instructions for performing control at one or more load control devices. For example, the system controller 110 may receive a button press from the remote control device 170 or a sensor measurement event from the sensor device 140 and interpret these messages to generate control instructions based on configuration settings defined in the system configuration data of the load control system 100. As described herein, configuration settings may define certain values to each of the respective parameters associated with a given device. For example, the control setting for a lighting control device may include values for the full-color lighting control, the color temperature lighting control parameter, the vibrancy parameter configured, and/or the intensity parameter. The remote control device 170 may transmit a message via a wired or wireless communication link that indicates an actuation of a button to the system controller 110, which may receive the actuation and identify the button that was actuated to generate corresponding control instructions based on the configuration settings defined in the system configuration data of the load control system 100. The system controller 110 may then transmit messages to the load control devices for the load control devices to then control respective electrical loads. In another example, the system controller 110 may forward the inputs or control instructions received from the input devices to the load control devices. Thus, the input devices or the load control devices themselves may interpret the inputs to generate the control instructions, and the system controller 110 may route the messages based on the association information stored thereon. In other words, the input devices, the load control devices, as well as other devices in the load control system may communicate via the system controller 110. According to another and/or additional example, the input devices may directly communicate with the load control devices without the assistance of the system controller 110. The system controller 110 may still monitor such communications. According to a further and/or additional example, the system controller 110 may originate and then communicate messages with input devices and/or load control devices. Such communications by the system controller 110 may include system configuration data (e.g., including configuration settings) for the control devices, such as configuring scene buttons on light switches. Communications from the system controller 110 may also include, for example, messages directed to load control devices and that include control instructions or commands for the load control devices to control respective electrical loads in response to the received messages. For example, the system controller 110 may communicate messages to change lighting intensity levels, to change lighting color settings, to change levels of the window fabric 152, to change HVAC settings, etc. Thus, the system controller 110 may operate as a control device or input device itself, by generating the control instructions thereon in response to one or more triggering events (e.g., timeclock events and/or other local triggering events) to transmit messages to the load control devices to control the corresponding electrical loads in the load control system 100.

The system controller 110 and/or the input devices of the load control system 100 may be configured to transmit messages including preset commands (e.g., scene commands). The load control devices that receive the scene command and are configured to be responsive to the scene command may control their respective electrical loads according to different settings (e.g., to different levels) depending upon the particular scene that was included in the scene command. The load control devices may store the particular settings to which to control their lighting load in response to various scenes, such that a single scene command can be transmitted to multiple load control devices for controlling multiple electrical loads according to different settings.

The load control system 100 of FIG. 1 may be configured such that the system controller 110 is capable of communicating with a user device 190. The user device 190 may be a computing device executing software for enabling configuration and/or control of the devices in the load control system 100. The user device 190 may be local to the system controller 110, such that the two may directly communicate in a point-to-point fashion or through a local network specific to the user environment 102. For example, the network may be provided by a router that is local to the user environment 102. It may be advantageous to allow the user 192 to communicate with the system controller 110 via the user device 190 and to control the load control system 100 from remote locations, such as via the Internet or other public or private network. Similarly, it may be advantageous to allow third-party integrators to communicate with the system controller 110 in order to provide enhanced services to users of user environment 102. For example, a third-party integrator may provide other systems within user environment 102. It may be beneficial to integrate such systems with load control system 100. In addition, the system controller 110 may be configured to communicate via the network with one or more other control systems (e.g., a building management system, a security system, etc.).

The system controller 110 may be configured to communicate via the network with the user device 190. The user device 190 may be a personal computing device, such as a laptop, a smart phone, and/or a tablet device. The user device 190 may be characterized by a unique identifier (e.g., a serial number or address stored in memory) that uniquely identifies the user device 190 and thus the occupant 192. The user device 190 may be configured to transmit messages to the system controller 110, for example, in one or more Internet Protocol packets and/or another wireless communication protocol (e.g., BLUETOOTH, etc.). For example, the user device 190 may be configured to transmit messages to the system controller 110 over the LAN and/or via the Internet. The user device 190 may be configured to transmit messages over the Internet to an external service, and then the messages may be received by the system controller 110. The user device 190 may transmit and receive RF signals 109. The RF signals 109 may be the same signal type and/or transmitted using the same protocol as the RF signals 108. Alternatively, or additionally, the user device 190 may be configured to transmit RF signals according to another signal type and/or protocol. The load control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The load control system 100 may include a computing device 111 (e.g., a personal computer, laptop, etc.) with which the system controller 110 and/or the user device 190 may be capable of communicating via the network. For example, the computing device 111 may communicate with the system controller 110 and/or the user device 190 via the Internet and RF signals 109. The computing device 111 may also or alternatively communicate with the system controller 110 and/or the user device 190 via a wired communication link. The computing device 111 may include one or more portions of the system configuration data. For example, one or more portions of the system configuration data may be generated at the computing device 111 and transmitted to the system controller 110 and/or the user device 190 for performing configuration and/or control of the load control system 100. Also, or alternatively, the computing device 111 may retrieve the system configuration data from one or more databases 111*b* via a cloud 111*a*, as shown in FIG. 1.

The operation of the load control system 100 may be programmed and configured using, for example, the user device 190 or other computing devices (e.g., when the user device is a personal computing device). The user device 190 may provide the user with access to a control/configuration application (e.g., via a graphical user interface (GUI)) for allowing a user 192 to program how the load control system 100 will operate and/or be controlled. For example, the control/configuration application may be executed as a local application on the user device 190, or as a remote application or service (e.g., executing on the computing device 111, the system controller 110, and/or another remote computing device) that is accessed via a local application (e.g., a web browser or other local application enabling a web interface). The control/configuration application and/or the system controller 110 (e.g., via instructions from the control/configuration application) may generate and/or store the system configuration data for enabling control of the devices in the load control system 100. The system configuration data may comprise a load control database that defines the operation of the load control system 100. Examples of configuration procedures for load control systems are described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

The user device 190 may be used to update the system configuration data on which the load control system 100 operates. For example, the user 192 may request that the system configuration data, or portions thereof, be displayed on the user device 190, e.g., via the control/configuration application executed on the user device 190. The control/configuration application may request the system configuration data from one or more other devices in the load control system 100, such as the system controller 110 and/or the computing device 111. Upon receiving the information requests from the control/configuration application on the user device 190, the system controller 110 and/or the computing device 111 may respond by communicating the requested system configuration data to the user device 190. The control/configuration application on the user device 190 may also allow the user 192 to communicate messages to the system controller 110 and/or the computing device 111 to modify, edit, or change the system configuration data, such as a scene configurations stored therein, as further described herein.

The system configuration data may be stored at the system controller 110, and/or may be distributed across the various devices in the load control system 100 for enabling control and/or configuration of the load control system (e.g., such as by being stored at the computing device 111, the user device 190, and/or the control devices). For example, the association information and/or configuration settings for each control device may be stored locally at the control devices. The system configuration data may include information about the devices in the user environment 102 and/or the load control system 100. Such information may include, for example, the unique identifier of specific devices that are part of the load control system 100, the association information defining the associations between the devices for enabling communication and/or control, and/or the configuration settings for controlling devices in the load control system.

The system configuration data may define one or more zones that comprise a zone identifier with which the input devices and/or load control devices and corresponding loads may be associated for collective control. Each zone may include one or more electrical loads. The electrical loads in a zone may have a same control type for controlling electrical loads and/or load control devices in the zone. The electrical loads and/or load control devices in a zone may be different, but may have the same control type. For example, a zone may be defined in the system configuration data with a zone identifier that is associated with two of the lighting loads 122 of the lighting fixtures 124, while another zone identifier is associated with the other two lighting loads 122 of the lighting fixtures 124. Each of these two zones may have the same control type, which is dictated by the lighting loads 122 of the respective zones. Another third zone may be defined in the system configuration data with a different zone identifier that is associated with the lighting load 115, as the lighting load 115 may be a different type of lighting load than the lighting loads 122 and capable of a different type of control. This third zone may have a control type that is therefore different from the control type of the first two zones. The zone identifier and its associated control type may identify the electrical loads and/or the load control device capabilities for controlling the electrical loads of the zone.

As an example, lighting control devices having a same control type (e.g., product type and/or load type) may be capable of being configured in the same zone for enabling collective control. As such, zones may be defined in the system configuration data that have the same control type. As described herein, the control type of a zone may be driven by the product type and/or load type of the devices in the zone and may indicate the capabilities of the control devices and/or loads in that zone. In creation of the zones in the system configuration data, lighting control devices and lighting loads having the same control type may be assigned to the same zone and thus associated with the same zone identifier. Different zones may be defined for devices having different control types. Multiple zones may be defined for lighting devices having the same control type.

Each control type may indicate the control devices and/or loads that are capable of receiving one or more parameters/configuration settings for enabling a similar type of control. As described herein, the parameters for a lighting control device may include the full-color lighting control parameter configured to enable full-color lighting control, the color temperature lighting control parameter configured to enable color temperature lighting control (e.g., correlated color temperature lighting control), the vibrancy parameter configured to enable vibrancy control, the intensity parameter configured to enable dimmable lighting control (e.g., intensity control), the on/off parameter configured to enable switched lighting control (e.g., on/off control), and/or other control parameters for enabling other lighting control features. Each zone may include loads and/or the control devices capable of receiving the same parameters, the set of parameters dictating the control type of the loads/the control devices and thus the zone. Hence, each zone may be defined/associated with the same control type, indicating that the loads/the control devices of the zone are capable of being controlled in response to one or more of the same parameters. For example, zones of lighting devices capable of white color tuning may be configured to perform control according to parameters for dimmable lighting control and color temperature lighting control in response to configuration settings for each parameter. White color tuning may be defined as a control type for lighting control devices and/or lighting loads capable of both dimmable lighting control and color temperature lighting control. Lighting devices that are capable of performing full-color lighting control may be capable of being controlled according to parameters that include different lighting intensity values for performing dimmable lighting control and color values on a color gamut or across a visible light spectrum for performing color control. Full-color lighting control may be defined as a control type for enabling such control in response to configuration settings for various parameters. Lighting devices that are capable of performing color temperature lighting control may be capable of being controlled to different color temperature values (e.g., correlated color temperature values on the black body locus) as a result of change in one or more parameter values. One example of the color temperature control may be a warm dim color temperature control in which lighting devices may be capable of being controlled to different color temperature values as a result of changes in an intensity value. Color temperature control may be defined as a control type for enabling such control in response to configuration settings for various parameters. Lighting devices that are capable of performing vibrancy control may control or be responsive to a control setting for a vibrancy parameter that is configured to control the color saturation of the objects in the user environment. Vibrancy control may be defined as a control type for enabling such control in response to configuration settings for various parameters. Lighting devices that are capable of performing dimmable lighting control may be capable of being controlled to different lighting intensity parameter values. Dimmable lighting control may be defined as a control type for enabling such control in response to configuration settings for various parameters. Lighting devices that are capable of performing switched lighting control may be capable of being switch to an on state or an off state. Switched lighting control may be defined as a control type for enabling such control in response to configuration settings for various parameters.

It will be understood that different control types may be defined for lighting control devices capable of performing control in response to different control parameters. In one example, a first zone may be defined for lighting devices with a first control type indicating the lighting devices can accept/receive configuration settings for various parameters that perform full-color lighting control, color temperature lighting control, vibrancy lighting control, dimmable lighting control, and switched lighting control; a second zone may be defined for lighting devices with a second control type indicating the lighting devices can accept/receive configuration settings for various parameters that perform color temperature lighting control, dimmable lighting control, and switched lighting control; a third zone may be defined for lighting devices with a third control type indicating the lighting devices can accept/receive configuration settings for various parameters that perform color temperature lighting control, dimmable lighting control, and switched lighting control; and a fourth zone may be defined for lighting devices with a fourth control type indicating the lighting devices can accept/receive configuration settings for various parameters that perform switched lighting control.

As described herein, the devices in a load control system may be grouped or organized together based on their respective area or location within the user environment 102 (e.g., the devices in a single room may be organized or grouped together). The area may indicate a location or sub-location within the user environment 102. This indicator may be in the form of an area name (e.g., a text string) and/or an indicator that may be translated into the area name (e.g., a text string), although other mechanisms may be used. For example, assuming the user environment 102 is a home, possible areas may include standard locations within a building like "kitchen," "living room," "family room," "dining room," "master bedroom," "bedroom," "master bathroom," "bathroom," "basement," "front porch," "office," "lobby," "conference room," etc. Areas may also include sub-locations in a room like "basement—sitting area," "basement—game area," basement—work area," basement—storage area," etc. Areas may also include user defined/customized locations like: "Mary's bedroom," "John's bedroom," etc. The area of a control device may be programmed into the system configuration data of the load control system 100 by the user 192 when installing the system 100 within the user environment 102. One will recognize these are examples.

After the devices are grouped or organized based on the area to which they are assigned in the user environment 102, the devices may also be assigned to a certain zone within the area, which is then stored in the system configuration data. For example, the lighting devices in a certain area of the user environment 102 may be assigned to a zone based on their respective function (e.g., the lighting control devices that are intended to emit light on a certain surface, such as desk, may be grouped or organized together in a "Desk Area" zone). Grouping or organizing the devices in a load control system based on their area and assigning them to a zone (e.g., based on their function) within the area may allow the user 192 to configure or control the devices within a load control system 100 more efficiently. For example, as the number of devices in the load control system 100 increases, the settings that may be configured by the user 192 may also increase. And without grouping or organizing the devices into a more manageable subset of devices, the user 192 may fail to accurately and efficiently control the increased number of devices in the load control system 100. Moreover, the capabilities and, as a result, the configurable settings of each of the devices may differ, further increasing the complexity of configuring or controlling the load control system 100. If, however, the devices are grouped by their respective area and are assigned to a zone within the area (e.g., based on their respective function), the user 192 may configure the devices in the load control system 100 by zone, which may improve the accuracy and efficiency of configuring and controlling the load control system 100.

One type of collective configuration for performing control of areas and zones may include configuration of scenes. A scene may be a defined set of configuration settings for controlling electrical loads in response to a triggering event (e.g., actuation of a button, a sensor event, a time clock event, or another triggering event) in the load control system 100. The system configuration data may define unique identifiers for the scenes of the load control system 100, the respective configuration settings for each of the defined scenes (e.g., lighting intensity levels for the lighting loads 115, 122, color settings and/or correlated color temperature settings for the lighting loads 115, 122, settings that indicate a level for the covering material 152 of the motorized window treatments 150, lighting intensity levels for the lamp 142, volume levels for the speaker 146, HVAC settings for the HVAC system 162, or other settings that may be defined in one or more scenes), and/or the input events or other triggering events (e.g., such as an actuation by a user from an application, such as the control/configuration application or an input device, such as the remote-control device 170, a sensor measurement event, a timeclock event, or another triggering event) that may be used to enable each of the defined scenes. The system configuration data may include additional information about the devices in the user environment 102 or load control system 100, and the examples provided herein are not exhaustive. The scene may include, for example, configuration settings for controlling one or more zones of electrical loads in an area in response to the triggering event.

The control/configuration application on the user device 190 may be used to define or modify the scenes. The control/configuration application on the user device 190 may request/obtain information related to the scenes and as further described below, thereafter allow the user 192, via the user device 190, to define or update a given scene, resulting in the control/configuration application instructing another device (e.g., the system controller and/or one more control devices) to configure the control devices according to the selected scene. As also described below, the control/configuration application may allow the user 192 to modify pre-programmed scenes (e.g., scenes that may be configured by defaults) and to create and store scenes created by the user that may subsequently be selected by the user 192.

As the capabilities or controllable features and, as a result, the configurable configuration settings of each of the electrical loads and load control devices in the load control system 100 may differ, there may be an increased complexity in properly configuring and/or controlling different scenes in the load control system 100. For example, even in a given area that is defined in the system configuration data, there may be multiple zones defined with different types of electrical loads and/or load control devices that have different capabilities for controlling different features of the electrical loads. In one example, the lighting loads 122 and/or the lighting control devices 120 in the lighting fixtures 124 may be capable of full color control or color temperature control, while the lighting load 115 and/or the lighting control device 113 may be limited to switch control or dimming control. In another example, though the lighting loads 122 in the lighting fixtures 124 and the lighting load 115 may be different types of lighting loads, they may have similar load control capabilities for enabling a similar type of control within the load control system 100. A user attempting to configure the load control system may become overwhelmed with the increased complexity in properly configuring and/or controlling the load control system 100. The more features that are available for different types of lighting loads, the more complex the configuration of the load control system may become. Improper configuration of the scenes may make one or more zones or areas in the scene inoperable or inoperable for a given purpose. When different zones have different capabilities, configuration of the zones for being controlled within the same scene can be difficult.

The control/configuration application may provide the user 192 with curated configuration options (e.g., curated scene options) on the user device 190. For example, the curated configuration options provided to the user 192 may be used to enable load control systems, such as the load control system 100, to be configured for scene control. As described herein, curated configuration options may enable control for different types of electrical loads and/or load control devices that are installed, particularly in a given area, and configured for collective control in response to a triggering event (e.g., button press, sensor measurement event, timeclock event, or another triggering event) for the scene. For example, the curated configuration options may provide a user attempting to configure or control a complex load control system, such as the user 192, with a uniquely chosen (e.g., curated) set of curated configuration settings (e.g., scene settings) for configuring or controlling the load control system. For example, the set of curated configuration settings may be based on one or more user selections of the curated configuration options. Examples of the curated configuration settings (e.g., curated configuration settings) may operate as a starting point for the user to be able to adjust for complex load control systems. The user may then be able to easily adjust the curated configuration settings and configure or control the load control system according to their preferences. The curated configuration settings described herein may also decrease the amount of time necessary for the user to configure or control the load control system.

The curated configuration settings may depend on the controllable parameters for a given load control device and/or load. For example, curated lighting configuration settings may include a curated lighting intensity setting, a curated full-color lighting control setting, a curated color temperature lighting control setting (e.g., curated correlated color temperature lighting control setting), a curated vibrancy control setting, a curated on/off control setting, and/or other curated configuration settings for lighting control features, which may depend on the control type for a given lighting control device and/or lighting load. Some lighting control devices and/or lighting loads may be capable of performing control in response to different control parameters. For example, a first lighting control device may be capable of performing color temperature control in response to a color temperature setting of a color temperature lighting control parameter and lighting intensity control in response to a lighting intensity setting of a lighting intensity parameter, while a second lighting control device may be limited to performing lighting intensity control in response to a lighting intensity setting of a lighting intensity parameter. Additionally, or alternatively, some lighting control devices and/or lighting loads may be capable of performing control within a different range of settings or in response to different setting values within a given control parameter. For example, a first lighting control device may be capable of performing full-color control or color temperature control in response to a broader range of setting values than a second lighting control device that may be limited to performing full-color control or color temperature control in response to a narrower range of setting values for the same control parameter.

The control/configuration application may access a predefined dataset (e.g., stored in the system configuration data or separately stored in memory) of control types for different lighting loads and/or lighting control devices in a defined zone. For example, different types of lighting loads and/or lighting control devices may be grouped in the dataset according to a respective control type. The types of lighting loads and/or lighting control devices may be identified in the dataset by a unique identifier (e.g., product identifier, feature identifier, brand, and/or other unique identifier). The different control types may group together lighting and/or lighting control devices capable of receiving similar parameter settings in commands that may be transmitted for performing control of similar features of the lighting loads and/or lighting control devices of a given control type. Each control type may indicate the lighting control devices and/or lighting loads that are capable of full-color lighting control, color temperature lighting control (e.g., correlated color temperature lighting control), vibrancy control, dimmable lighting control (e.g., intensity control), switched lighting control (e.g., on/off control), and/or other lighting control features. As described herein, different control types may be defined for lighting control devices capable of performing control in response to different combinations of control parameters.

As described herein, a zone by be assigned a lighting zone purpose. When configuring a scene, one or more zones may be assigned to the scene. Each of the one or more zones may be assigned a respective zone purpose. For example, the lighting zone purpose of each of the lighting zones may include purposes such as ambient lighting, accent lighting, task lighting, or another lighting purpose for a lighting zone. The lighting zone purpose may define the function of the lighting control device and/or lighting load in the zone within the load control system. When the lighting zone purpose is identified by the control/configuration application for each of the zones in a scene, the control/configuration application may determine (e.g., automatically determine) curated configuration settings for each zone in the scene based on the identified zone purpose and the selected curated configuration option for the scene. The curated configuration options may include options such as: "Standard," "Energize," "Relax," "Entertain," "Natural," "Romance," "Cook," and/or other options that may indicate a desired scene for being selected by a user for configuring the scene. Each of the curated configuration options may be used by the user to define the type of control that is intended to perform for a given scene. The curated configuration settings may also be determined (e.g., automatically determined) based on the respective locations of the zones, zone description, fixture type, control type (e.g., product type, and/or load type). In certain implementations, the curated configuration setting may be determined based on certain predefined configuration settings for a given control type. Referring to the example load control system illustrated in FIG. 1, the predefined configuration settings may be stored in the database 111b and accessed via the computing device 111 via the cloud 111a.

After the curated configuration settings are automatically determined, the control/configuration application may, in response to manual inputs from a user, update the curated configuration settings to include in the scene. The control/configuration application may be configured to store the automatically-determined curated configuration settings and/or the updated scene settings for later controlling the zones in the scene in response to the triggering event for the scene. After generating the curated configuration settings and/or updating the curated configuration settings, the user device 190, via the control/configuration application, may transmit the curated configuration settings to other devices in the load control system 100 (e.g., the system controller 110, remote-control device 122, control devices, such as input devices and/or load control devices). Then, in response to a triggering event for enabling a scene, one or more devices may perform control based on the scene settings (e.g., the initial curated configuration settings and/or the updated curated configuration settings).

Figure 2:
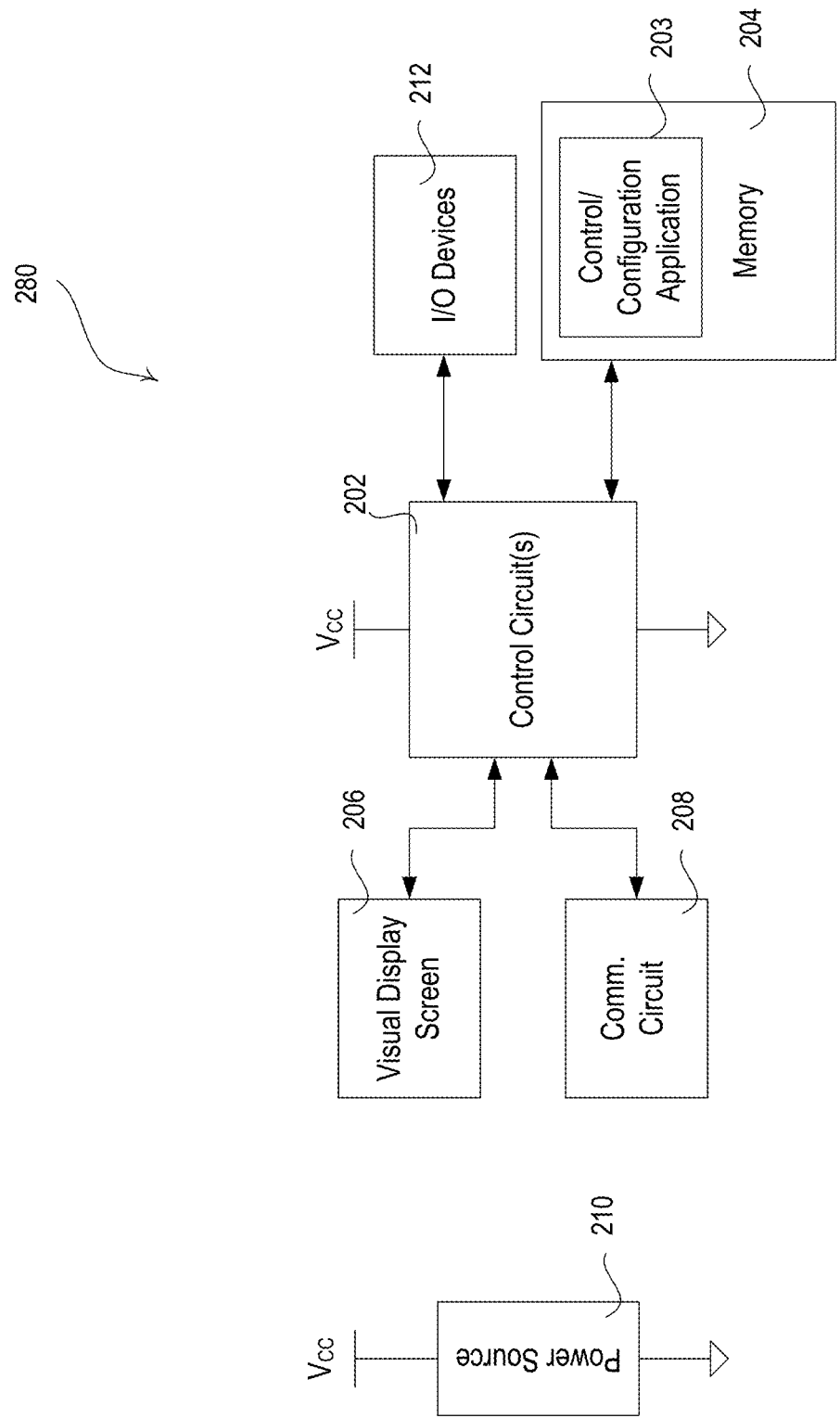
FIG. 2 shows an example block diagram of a computing device.

FIG. 2 shows an example block diagram of a computing device 280. The computing device 280 may include the user device 190, the system controller 110, the computing device 111, or another computing device of FIG. 1 on which a control/configuration application, such as the control/configuration application 203, may be executed. The control/configuration application 203 may be executed at a single computing device 280. Also, or alternatively, the control/configuration application 203 may be executed across multiple computing devices, which may comprise similar configurations to the computing device 280. The computing device 280 may include a control circuit 202 (e.g., one or more control circuits), which may include one or more general purpose processors, special purpose processors, conventional processors, digital signal processors (DSPs), microprocessors, microcontrollers, integrated circuits, programmable logic devices (PLD), application specific integrated circuits (ASICs), or the like and/or may further include other processing element(s), such as one or more graphic processors. However, the one or more graphic processors may be included in a separate graphic processor circuit. The control circuit 202 may control the functionality of the computing device 280 and may execute the control/configuration application 203, in addition to other software applications such an operating system(s), database management systems, etc., to provide features and functions as describe herein. The control circuit 202 may also perform signal coding, data processing, power control, input/output processing, and any other functionality that enables the computing device 280 to perform as described herein.

The computing device 280 may also include memory 204 (including volatile and non-volatile memory) which may be non-removable memory and/or a removable memory. The memory 204 may be communicatively coupled to the control circuit 202 to store information in and/or retrieve information from the memory 204. The memory 204 may be non-removeable and may include random-access memory (RAM), read-only memory (ROM), a hard disk(s), or any other type of non-removable memory storage. The memory 204 may be removeable and may include a subscriber identity module (SIM) card, removable disks, a memory stick, a memory card, optical media such as CD-ROM disks, digital versatile disks (DVDs), or any other type of removable memory. The memory 204 may be implemented as an external integrated circuit (IC) or as an internal circuit of the control circuit 202, and/or reside external to the control circuit 202. The memory 204 may store the control/configuration application 203 as executable instructions and may also provide an execution space as the control circuit 202 executes the control/configuration application 203.

The memory 204 may comprise a computer-readable storage media or machine-readable storage media having the control/configuration application 203 stored thereon as a computer program, software, instructions, or firmware for execution by the control circuit 202. The control circuit 202 may access the computer program, software, instructions, or firmware of the control/configuration application 203 for being executed to cause the control circuit 202 to operate as described herein, or to operate one or more devices as described herein. The memory 204 may store one or more portions of the system configuration data described herein. The memory may also, or alternatively store curated configuration options (e.g., curated scene options) for configuring the system configuration data. Though computing device 280 on which the control/configuration application 203 may be executed, the control/configuration application 203 may execute on other types of computing devices or machines.

The computing device 280 may also include a visual display screen 206 that may be communicatively coupled to the control circuit 202 (e.g., one or more graphic processor circuits of the control circuit 202). Together with the control circuit 202, the visual display screen 206 may display information to the user via one or more GUI-based interfaces/GUI based "window(s)" as described herein. In addition to including GUI based software components, for example, that provide the graphical features and visual images described herein, the control/configuration application 203 may also include a logic engine(s) for providing features of the GUI and features of the application in general as described herein. The display screen 206 and the control circuit 202 may be in two-way communication, as the display screen 206 may include a touch sensitive visual screen component configured to receive information from a user and providing such information to the control circuit 202

The computing device 280 may also include one or more input/output (I/O) devices 212. The I/O devices 212 may include a keyboard, a touch sensitive pad, a mouse, a trackball, an audio speaker, an audio receiver, and/or another I/O device that may be communicatively coupled to the control circuit(s) 202. The I/O devices 212 may allow the user to interact with the control/configuration application 203, for example. The computing device 280 may further include a communication circuit 208 (e.g., one or more communication circuits) for communicating (transmitting and/or receiving) over wired and/or wireless communication networks, for example. The communications circuit 208 may include an RF transceiver(s), RF receivers, RF transmitters, and/or other circuits configured to perform wireless communications. The communications circuit 208 may be in communication with control circuit 202 for transmitting and/or receiving information.

Though a single communication circuit 208 may be illustrated, multiple communication circuits may be included in the computing device 280. The computing device 280 may include a communication circuit configured to communicate via one or more wired and/or wireless communication protocols and at least one other communication circuit configured to communicate via one or more other wired and/or wireless communication protocols. For example, a first communication circuit may be configured to communicate via a wired or wireless communication link, while a second communication circuit may be capable of communicating on another wired or wireless communication link. The first communication circuit may be configured to communicate via a first wireless communication protocol on a network communication link and the second communication circuit may be configured to communicate via a second wireless communication protocol on a short-range communication link or a direct communication link.

Each of the components within the computing device 280 may be powered by a power source 210. The power source 210 may include an AC power supply and/or DC power supply, for example. The power source 210 may generate a supply voltage(s) $V_{CC}$ for powering the components within the computing device 280.

Though the computing device 280 is illustrated as including the control/configuration application 203, other computing devices in the load control system may include a similar configuration or components without having the control/configuration application 203 stored or resident thereon. For example, the system controller 110, the computing device 111, the user device 109, or another computing device of FIG. 1 may include a similar configuration or components, while the control/configuration application 203 may be resident on another computing device. The user device 109 may have another local application (e.g., a web browser or other application) stored thereon in the memory 204 for being executed for accessing the control/configuration application to provide the features and functions as described herein. In another example, portions of the control/configuration application may be distributed across one or more computing devices.

As indicted, the computing device 280 may be similar to the user device 190, as described herein. Accordingly, the control/configuration application 203 may cause the control circuit 202 to communicate (e.g., via the communication circuit 208 of the computing device 280) with the other devices of the user environment (e.g., the system controller 110, input devices, load control devices, computing device 111, etc.) via a network local to the user environment. Nonetheless, one will recognize that the control/configuration application 203 and/or the computing device 280 may communicate with other devices using other communication systems and/or protocols, etc. In addition, the control/configuration application 203 is described herein as being a self-contained application that executes on the computing device 280 and communicates messages with the system controller 110, for example. In other words, logic of the control/configuration application 203 and generated graphics associated with the application are described herein as executing from the computing device 280. Nonetheless, features and/or graphics of the control/configuration application 203 may be implemented in other fashions, such as a web hosted application with the computing device 280 interfacing with the web hosted application using a local application (e.g., a web browser or other application) for providing features and functions as described herein. As one example, the system controller 110 or the computing device 111 may function as the web host executing the control/configuration application 203.

As one example, the computing device 280 may display to a user via the visual display screen 206 an icon associated with the control/configuration application 203. The computing device 280 may detect the selection of the icon by the user (e.g., such as detecting the using touching the icon) and in response, may start (e.g., which may also be referred to herein as launching, running, executing, activating and/or invoking) the control/configuration application 203. The control/configuration application 203 may be started in other ways, including the computing device 280 being configured to automatically start the application upon being reset and/or powered on. In response to being started or launched, the control/configuration application 203 (in addition to performing security/authentication procedures, for example) may communicate one or more messages to the system controller 110 and/or the computing device 111, for example, to obtain/request/query for the system configuration data, and use this information and data to initially generate and display to the user via the display screen 206 of the computing device 280 a graphical user interface.

Upon receiving information requests from the control/configuration application 203 (such as requests for status and configuration information), the system controller 110 and/or the computing device 111 may respond by communicating the requested system configuration data. The control/configuration application 203 may also allow the user 192 to communicate messages to the system controller 110 and/or the computing device 111 to modify, edit, or change the system configuration data, such as the scene configurations stored therein, as further described herein.

The system configuration data may indicate the configuration of the load control system 100 from another device in the load control system, such as the system controller 110, the computing device 111, and/or one or more control devices (e.g., input devices and/or load control devices). Also, or alternatively, the computing device 280 may itself store or maintain the system configuration data (e.g. or a subset thereof), and the control/configuration application 203 may request/obtain this information from the memory(s) 204. Such information may include, for example, the unique identifier of specific control devices that are part of the load control system 100, association information for the control devices, areas and/or zones defined in the system configuration data.

The control/configuration application 203 may store the predefined dataset of control types for different types of lighting loads and/or lighting control devices in the memory 204. The types of lighting loads and/or lighting control devices may be grouped in the dataset by a unique identifier (e.g., product identifier, feature identifier, brand, and/or other unique identifier). The different control types may group together lighting loads and/or lighting control devices with similar lighting control features and/or capable of responding to the same parameter settings in commands that may be transmitted for performing control of similar features of the lighting loads and/or lighting control devices of a given control type.

The control/configuration application 203 may store the configuration settings for each zone in the memory 204 for configuring a scene. The configuration settings for each scene may be accessed from the memory 204 based on the control types identified in the dataset for the electrical loads and/or load control devices in the scene. The configuration settings may be used for configuring and/or controlling devices in the load control system in response to a triggering event for a scene.

Figure 3C:
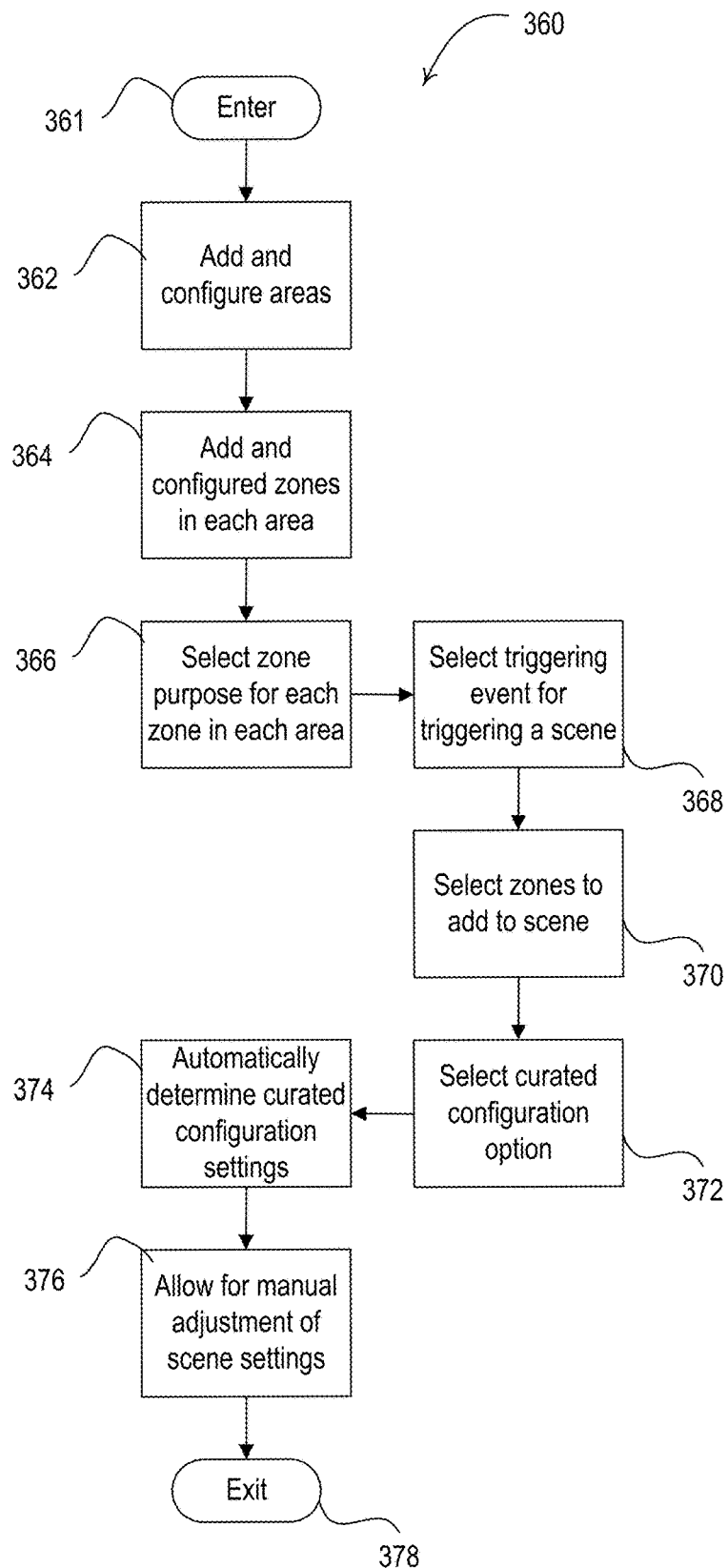
FIG. 3C is a flowchart depicting an example procedure for automatically generating curated configuration settings for a scene based on a selected curated content option and/or zone purposes of one of more zones included in the scene.

FIGS. 3A to 3C are flowcharts that illustrate example procedures for configuring and/or controlling a load control system. Referring first to FIG. 3A, there is shown an example procedure 300 for displaying and updating system configuration data for a load control system. The procedure 300 may be performed by a control/configuration application being executed by one or more control circuits by accessing instructions stored in memory on one or more devices, such as the control/configuration application 203 residing on memory 204 on the computing device 200, and may enter at 301. For example, the procedure 300 may enter in response to an indication from a user to update the system configuration data for a load control system (e.g., via a computing device executing the control/configuration application, such as the user device 190, system controller 110, and/or computing device 111 of FIG. 1, or the computing device 280 of FIG. 2). The procedure 300 may be performed after the devices in a load control system have been grouped or organized (e.g., by a user) into respective areas in a user environment and assigned to zones within a respective area (e.g. as further described herein with respect to FIGS. 3C and 3D). Also, or alternatively, the procedure 300 may be performed prior to the devices in a load control system being grouped or organized by their respective area in a user environment and/or assigned to a zone, which may be stored and/or maintained in the system configuration data.

At 302, the control/configuration application may retrieve the system configuration data for the load control system. For example, the system configuration data may indicate or otherwise describe the devices that are configured in the load control system. The system configuration data may include a unique identifier of the areas of the user environment/load control system that the devices are organized or grouped by. The system configuration data may also include a unique identifier of the zones within each of the areas that the devices are assigned to, and/or one or more defined scenes for controlling the devices assigned to the zones. The system configuration data may be retrieved from a single device (e.g., a system controller, such as the system controller 110, or a remote computing device, such as the computing device 111), or portions of the system configuration data may be retrieved from multiple devices (e.g., a system controller, remote computing device, one or more control devices, and/or another device in the load control system). The system configuration data may also be obtained from devices external to the load control system, such as from cloud based system or other load control systems to which a given load control system is integrated with.

After retrieving the system configuration data, the control/configuration application may display a representation of the system configuration data (e.g., or a portion of the system configuration data) at 304. For example, the control/configuration application may display a representation of a defined scene for controlling one or more zones in an area of the user environment or load control system via a graphical user interface.

At 306, the control/configuration application may receive updates or changes to the system configuration data, for example, from a user. As described herein, changes to the system configuration data may include changes or updates to configuration settings (e.g., lighting intensity level, color, correlated color temperature, vibrancy, etc.) for a defined scene. For example, the system configuration data may be updated using curated configuration options and/or automatically determined curated configuration settings, as described herein. FIGS. 4A to 4F illustrate example graphical user interfaces that may be displayed by the control/configuration application to represent the system configuration data and/or receive updates to the system configuration data.

At 308, the control/configuration application may determine whether there are additional updates to the system configuration data. If the control/configuration application determines that there are additional updates, the control/configuration application may receive the additional updates. If, however, the control/configuration application determines that there are no additional updates, the control/configuration may store or send (e.g., store the updated configuration data locally or send the configuration data to another device, such as a system controller or remote computing device) the updated system configuration data at 310 and the procedure 300 may exit at 311. For example, the control/configuration application may determine that there are no additional updates when the control/configuration application receives an indication from a user that there are not additional updates to the system configuration data (e.g., selecting a "Save" or "Finished" button).

Referring now to FIG. 3B, there is shown an example procedure 350 for controlling a load control system based on the system configuration data, which, as described herein, may be defined or updated using the procedure 300. The procedure 350 may be performed by a single device. For example, the procedure 350 may be performed by a system controller, a lighting control device, a user device or another computing device, or another control device to perform control using the system configuration data stored thereon. Also, or alternatively, the procedure 350 may be performed by multiple devices (e.g., a portion of the procedure 350 may be performed by an input device or a first load control device and another portion of the procedure 350 may be performed by a second load control device). For example, the system controller may retrieve the system configuration data (e.g., either locally or from another device) and perform control based on the system configuration data (e.g., by transmitting one or more message that include control instructions to perform control of one or more lighting control devices based on the system configuration data).

As illustrated in FIG. 3B, the procedure 350 may be performed in response to the detection of a triggering event at 351. A triggering event may be an event that causes the devices in a load control system to be controlled according to the system configuration data. For example, as described herein, a triggering event may be caused by a user actuation for activating a scene (e.g. by pressing a button that corresponds to a scene at a remote control device); a scheduled event (e.g., a timeclock event); and/or a sensor measurement event (e.g., an occupancy condition). Accordingly, the system configuration data may be retrieved at 352. As described herein, the system configuration data may be stored at a system controller and/or across one or more other devices (e.g., remote-devices, computing device s, lighting control devices, other control devices, etc.). Therefore, the system configuration data may be retrieved from a system controller and/or from one or other devices in the load control system. After retrieving the system configuration data, control may be performed based on the system configuration data at 354. For example, control may be performed by transmitting one or more messages that include control instructions (e.g., in response to the configuration settings for a scene) to the load control device(s) based on the system configuration data. In another example, control may be performed at the load control device by controlling the electrical load thereon. The procedure 350 may exit at 355.

As described herein, the steps of the procedure 300 and/or procedure 350 may be performed in different orders and/or multiple times. Although the individual steps of the procedure 300 and/or procedure 350 are described and/or illustrated in a particular order or combination, the steps may also be performed in various other orders or combinations.

As described herein, in certain load control systems (e.g., load control systems that include multiple zones, load types, zone purposes, etc.), the complexity in properly configuring and/or controlling different scenes in the load control system may increase. For example, even in a given area that is defined in the system configuration data, there may be multiple zones defined with different types of electrical loads and/or load control devices that have different capabilities for controlling different parameters of the electrical loads (e.g., full color control, color temperature control, vibrancy control, etc.). Some lighting loads may be capable of full color control and/or color temperature control, while other lighting loads may be limited to switching control (e.g., on/off control) or dimming control. A user attempting to configure the load control system may become overwhelmed with the increased complexity in properly configuring and/or controlling the load control system. As described herein, the more features that are available for different types of lighting loads, the more complex the configuration of the load control system may become. Improper configuration of the scenes, however, may cause one or more zones or areas in the scene to be inoperable (e.g., inoperable for a given purpose) and/or may result in an undesirable experience for a user.

To reduce the complexity of configuring such a load control system, a control/configuration application may provide a user with curated configuration options (e.g., curated scene options) on a user device (e.g., the user device 190 and/or a computing device (e.g., the computing device 111). As described herein, curated configuration options may enable control for different types of electrical loads and/or load control devices that are installed, particularly in a given area, and configured for collective control in response to a triggering event (e.g., button press, sensor measurement event, timeclock event, or another triggering event) for a scene. For example, the curated configuration options may provide a user with a curated set of configuration settings (e.g., scene settings) for configuring and/or controlling the load control system. For example, the set of curated configuration settings may be based on one or more user selections of the curated configuration options. The curated configuration settings may be automatically determined values for each controllable parameter that may be controlled by the one or more control types for the zone. Put differently, the control type for a zone may define or sets the controllable parameters for that control type/zone, and the automatically determined curated configuration settings may provide curated values for each of the controllable parameters based on the selected curated configuration option and/or the zone purpose. The curated configuration settings may be stored in the system configuration data at one or more devices for enabling control of the load control system. The curated configuration settings may serve as a starting point for the user to be able to adjust for configuring the system configuration data in complex load control systems. In certain scenarios, the user may be happy with the automatically determined curated configuration setting and make no updates. In other scenarios, the user may adjust the curated configuration settings and configure the load control system according to their preferences. The curated configuration settings described herein may also decrease the amount of time for the user to configure the load control system.

In order to provide the set of curated configuration settings, the control/configuration application may access a predefined dataset (e.g., stored in the system configuration data or separately stored in memory) of control types for different lighting loads and/or lighting control devices in a defined zone. For example, different types of lighting loads and/or lighting control devices may be grouped in the dataset according to a respective control type. The different control types may group together lighting loads and/or lighting control devices capable of receiving similar parameters in commands that may be transmitted for performing control of similar features of the lighting loads and/or lighting control devices of a given control type. Each control type may indicate the controllable parameters of which lighting control devices and/or lighting loads of that control type are capable of controlling, such as full-color lighting control, color temperature lighting control (e.g., correlated color temperature lighting control), vibrancy control, dimmable lighting control (e.g., intensity control), switched lighting control (e.g., on/off control), and/or other lighting control parameters. As described herein, different control types may define different capabilities of control to be performed in response to different combinations of control parameters. Additionally, or alternatively, different control types and/or lighting control devices may be defined for performing control within a different range of settings or in response to different setting values within a given control parameter.

When configuring a scene, one or more zones of lighting devices may be assigned to the scene, and each of the one or more zones may be assigned a respective zone purpose. For example, the purposes of lighting zones may include purposes such as ambient lighting, accent lighting, task lighting, art lighting, display lighting, spot lighting, or another lighting purpose for a lighting zone. Each of the one or more zones may also be associated with/assigned a respective a zone location (e.g., area name), zone description, fixture type, product type, and/or load type. When the lighting zone purpose is identified by the control/configuration application for each of the zones in a scene, the control/configuration application may determine (e.g., automatically determine) curated configuration settings for each zone in the scene based on the identified zone purpose and the selected curated configuration option for the scene. The curated configuration settings may also be determined (e.g., automatically determined) based on the respective area name, area type, zone description, fixture type, control type (e.g., product type and/or load type). After the curated configuration settings are automatically determined, the control/configuration application may, in response to manual inputs from a user, update the curated configuration settings to be included in the scene configuration stored in the system configuration data. The control/configuration application may be configured to store the automatically-determined curated configuration settings and/or the updated curated configuration settings in the system configuration data at one or more devices for later controlling the zones in the scene in response to the triggering event for the scene.

Referring now to FIG. 3C, there is shown an example procedure 360 for configuring a load control system with the use of curated configuration settings (e.g., curated configuration settings.) The procedure 360 may be performed by a control/configuration application being executed by one or more control circuits by accessing instructions stored in memory on one or more devices, such as the control/configuration application 203 residing on memory 204 on the computing device 200, and may enter at 361. For example, the procedure 360 may enter in response to an indication from a user to update the system configuration data for a load control system (e.g., via a computing device executing the control/configuration application, such as the user device 190, system controller 110, and/or computing device 111 of FIG. 1, or the computing device 280 of FIG. 2). The procedure 360 may be performed for generating and/or updating system configuration data. For example, the procedure 360 may be performed for adding and/or updating areas, zones, load control devices, and/or configuration/control of load control devices in areas and/or zones.

At 362, areas associated with the load control system may be added and configured by the control/configuration application. As described herein, the configured areas may correspond to the different locations or spaces within the load control system. During configuration of a given area, each area may be assigned a name (e.g., kitchen, master bedroom, foyer, hallway, etc.) and/or area type that indicates a function of the area. The area type may be assigned from a set area types, and the set of area types may be based on the type of space (e.g., commercial or residential). For example, the set of area types for a commercial space may include: Executive Office, General Office, Conference Room, Hallway, Bathroom, etc. The set of area types for a residential space may include: Bedroom, Living/Family Room, Bathroom. The assigned area names may be specific to a given space. For example, the area names for a commercial space may include: Corner Office, Office #302, West Conf Room, East hallway, Men's bathroom #1, etc. Similarly, the are names for a residential space may include: Master bedroom, Mike's bedroom, etc.

At 364, one or more zones may be added for each area. As described herein, each zone may include one or more load control devices and/or electrical loads as defined by a user (i.e., a user may define the loads in the zone). The one or more load control devices and/or electrical loads in the zone may have a same control type for controlling electrical loads and/or respective load control devices in the zone. During configuration, each zone may be assigned one or more of: a zone purpose, a zone description, fixture type, product type, and/or load type. For example, at 366, the zone purpose may be selected for each zone in the respective area. In certain implementation, selection of the zone purpose may be required, and a default zone purpose may applied if a user fails to select the zone purpose. A lighting zone purpose may include purposes of the corresponding lighting control device and/or lighting load in a lighting zone, such as ambient lighting, accent lighting, task lighting, or another lighting purpose for a lighting zone. The lighting zone purpose may define the function of the lighting control device and/or lighting load in the lighting zone. The zone purpose may be selected from a set of zone purpose options (e.g., ambient lighting, accent lighting, task lighting, etc.) and/or manually input by the user. This procedure for adding/configuring areas and/or zones may be performed for the remaining areas and zones within the load control system. While steps 362-366 are shown in linear order in FIG. 3C, these steps may be completed in a non-linear and/or looping manner. For example, a user may use the control/configuration application to add a first area, add all of the zones to the first area, and select the zone purposes for all of the zones in the first area, before adding a second area, adding all of the zones to the second area, and selecting the zone purposes for all of the zones in the second area. In addition, a user may add all areas for a building at once and then add all of the zones for all of the areas while selecting a zone purpose for each zone as each new zone is added.

At 368, a triggering event may be selected to be programmed for triggering a given scene. For example, the triggering event may be actuation of a button, a sensor event, a time clock event, or another triggering event. The triggering event may be configured to enable selection of the scene. For example, the user may use the control/configuration application to select at 368 a keypad and a button of the keypad to which to assign the scene. At 370, one or more zones may be added to the scene for the given trigger event. As described herein, the zones that are added to a scene may be controlled (e.g., according to one or more configuration settings defined by the scene) when the scene is selected. For the scene that is being configured, the user may select (e.g., via a control/configuration application) a curated configuration option from a set of curated configuration options at 372. For example, the set of curated configuration options may be displayed to the user and may include options such as: "Standard," "Energize," "Relax," "Entertain," "Natural," "Romance," "Work," Cook," "Clean," and/or another curated configuration option. Each of the curated configuration options may be used by the user to define the type of control that is intended to perform for a given scene. And, as further described herein, the selected curated configuration option may be used to assist the user in configuring a load control system. Although not shown in FIG. 3C, this procedure 360 may be performed for adding/configuring additional scene configurations within the load control system. Also, or alternatively, the procedure 360 may be used to configure other presets, such as a natural show, warm-dim curve, etc.

The control/configuration application may determine (e.g., automatically determine) curated configuration settings for controlling a respective zone within a scene. As shown, in FIG. 3C, for example, curated configuration settings may be automatically determined at 374. As described herein, the curated configuration settings for each zone may be automatically determined at 374 based at least on the zone purpose selected at 366 and/or the curated configuration option selected at 372. The curated configuration option may be selected by the user to indicate a desired setting for the purpose of different zones of electrical loads. In one example, when the curated configuration option is selected as "Energize," lighting zones that have a zone purpose of ambient lighting, task lighting, and accent lighting may each be set to an intensity value between 75% and 100% and/or a color temperature value between 5,000K and 7,500K (e.g., cooler color temperature values) for a more energized environment. In another example, when the curated configuration option is selected as "Relax," lighting zones that have a zone purpose of ambient lighting, task lighting, and accent lighting may each be set to an intensity value between 25% and 50% and/or a color temperature value between 2,000K and 5,000K (e.g., warmer color temperature values) for a more relaxed environment. The curated configuration settings may also, or alternatively, be automatically determined based on one or more of: the area name, the area type, the zone description, the fixture type, the product type, and/or the load type. For example, when the curated configuration option is selected as "Entertain," lighting zones that have a zone purpose of task lighting near a task surface (e.g., a television in the living room, an island in the kitchen, or another task surface in an area) may each be set to an intensity value between 45% and 65%, while the lighting zones that have a zone purpose of ambient lighting and accent lighting may each be set to an intensity value between 40% and 60% and/or a color temperature value between 2,000K and 5,000K (e.g., warmer color temperature values).

A curated configuration setting may be automatically determined for each controllable parameter in the zone. The controllable parameters in the zone may be defined by the one or more control types for the zone. For example, a lighting zone may be controlled according to a full-color lighting control parameter, a color temperature lighting control parameter, a vibrancy parameter, an intensity parameter, an on/off parameter and/or other control parameters for enabling other lighting control features. The control type and/or the controllable parameters may be determined from the system configuration data. The controllable parameters may be indicated by the control type, which may be defined by one or more of the product type, the load type (e.g., the combination of the product type and load type). The control type and/or the controllable parameters may be indicated by the manufacturer type of the load control device and/or the load.

As different types of load control devices and/or different types of loads may be controlled to different settings or within different ranges of settings for a controllable parameter (e.g., different full-color settings, different color temperature settings, different high-end or low-end intensity settings, etc.), the settings may be automatically determined based on the capabilities of the load control device and/or load. In one example, the control/configuration application may automatically determine the same curated configuration settings for each of the load control devices and/or loads in a given zone, even though the load control devices and/or loads have different capabilities. For example, the control/configuration application may automatically select the same color temperature value for controlling two different lighting devices with overlapping color temperature ranges. In another example, the control/configuration application may automatically determine a different curated configuration setting for each of the load control devices and/or loads in a given zone. For example, the control/configuration application may automatically determine a color temperature value for controlling the lighting devices in the zone and determine, based on the control type (e.g., the product type of the load control device and/or the load type), the manufacturer, or other system configuration data, that one of the lighting devices is incapable of being controlled to the determined curated configuration setting. In such an example, the control/configuration application may automatically determine curated configuration settings for each of the lighting devices based on the given the capabilities of a respective lighting device.

As described herein, the curated configuration settings may be used as a starting point for the user attempting to configure the load control system, which may decrease the complexity of configuring/controlling the load control system. At 376, the curated configuration settings may be adjusted, for example, based on the user's preferences and/or desired configuration (e.g., also referred to herein as updated scene settings). After any user adjustment, the control/configuration application may be configured to store the automatically-determined curated configuration settings and/or the updated curated configuration settings for later controlling the zones in the scene in response to the triggering event for the scene. At 378, the procedure 360 may exit.

As described herein, the steps of the procedure 360 (e.g., 361-378) may be performed in different orders and/or multiple times. For example, a user may add/configure the respective areas of the load control system, and then add/configure one or more zones for each of added/configured areas. Similarly, a user can may add/configure a respective area, zone, and scene, and then go back and add/configure one or more additional areas, zones, and/or scenes. Put differently, although the individual steps of the procedure 360 are described and/or illustrated in a particular order or combination, the steps may also be performed in various other orders or combinations.

FIG. 3D illustrates an example graphical user interface 380 that may be displayed by a control/configuration application to display and/or update the system configuration data for a load control system. The control/configuration application may display a graphical user interface (GUI)/and/or GUI-based "windows" to a user via a visual display of the computing device (e.g., the computing device 111 and/or the mobile device 190) and may allow a user of the computing device to interact with, control, and/or configure control devices within a user environment (e.g., user environment 102) or load control system (e.g. the load control system 100). For description purposes, the load control system 100 of the user environment 102 and the communication systems described with respect to FIG. 1 may be used herein as an example load control system and communication system to describe the control/configuration application. Nonetheless, the features and functions of the control/configuration application described herein are applicable to other types of control devices, load control systems, and/or communication systems.

As shown in FIG. 3D, the graphical user interface 380 may include one or more data types in the system configuration data, such as an area 382, a zone 384, a zone purpose 386, a zone description 392, an indication of a number of loads 394, a fixture type 396, a product type 388, and/or a load type 390. As described herein, configuration of a load control system may include adding and/or configuring one or more areas 382 and/or one or more zones 384. Each area 382 may be defined by an area name and/or another identifier of the area. Each of the areas 382 may also include one or more zones 384. Each zone may be associated with one or more of: a zone purpose 386, a zone description 392, an indication of a number of loads 394 in the zone, a fixture type 396, a product type 388, and/or a load type 390. As areas 382 and zones 384 are added/configured in the load control system (e.g., using any of the procedures 300, 350, 360), the control/configuration application may be configured to update the system configuration data based on the data types displayed in the graphical user interface 380. As described herein, the fixture type 396 may indicate/identify the particular model of the respective lighting fixture, and the model may be associated with respective information that indicates the size and number/type of lighting loads that can be installed in the fixture.

Referring to the example illustrated in FIG. 3D, the graphical user interface 380 may include a "Kitchen" area 382a and a "Living Room" area 382b. The Kitchen area 382a may include one or more zones, such as the "Linears" zone 384a. Similarly, the Living Room area 382b may include one or more zones, such as the Linears zone 384b and the Linears zone 384c. As described herein, a respective zone may be assigned a zone purpose during configuration of that respective zone. Referring again to FIG. 3D, each of the Linears zones 384a, 384b, 384c may be assigned a respective "Task" zone purpose. The zone purpose 386 may be selected from a predefined set of zone purposes (e.g., in a dropdown list) for each of the zones. For example, the predefined set of zone purposes may include one or more of the following: ambient, accent, task, etc. The predefined set of zone purposes may each be used to automatically determine the curated configuration settings in response to selection of a curated configuration option. Each zone 384a, 384b, 384c may also be assigned a zone description 392 that indicates the location (e.g., the relative location within the respective area 382) and/or another descriptive characteristic of the zone 384a, 384b, 384c. For example, the zone description 392a may indicate that the zone is "Near table" to indicate the location and the task surface that the zone 384a is located near in the Kitchen area 382a. The zone description 392b may indicate that the zone is "Near table" to indicate the location and the task surface that the zone 384b is located near in the Living Room area 382b. The zone description 392c may indicate that the zone is "Near counter" to indicate the location and the task surface that the zone 384c is located near in the Living Room area 382b. As shown in FIG. 3D, the zone 384a may include multiple loads that are indicated by the indication of a number of loads 394, while the zones 384b, 384c may each include a single load.

Each zone 384a, 384b, 384c may be assigned a fixture type 396, a product type 388 of a load control device for controlling a respective load, and/or a load type 390 for each load in the zone during configuration. For example, the zones 384a, 384b, 384c may each be assigned a product type 388 (e.g., 0-10V Controller) and a load type 390 (e.g., LED 0-10V) for each load in the zones 384a, 384b, 384c. The load type 390 may indicate one or more load control parameters for defining one or more control types for controlling the load having the defined load type 390. Though not shown in FIG. 3D, the product type 388 may also, or alternatively, define one or more load control parameters that may be controlled by the product type of the load control device.

As can be seen, as the number of areas, zones, etc. added to a load control system increases, the complexity of configuring/controlling the load control system may also increase. In order to reduce the complexity of configuring/controlling a given load control system, a control/configuration application may determine (e.g., automatically determine) curated configuration settings for a selected curated configuration option (e.g., Standard, Energize, Relax, Entertain, Natural, Romance, Cook, etc.) As described herein, the curated configuration settings may be automatically determined based on the assigned zone purpose 386. The curated configuration settings may also, or alternatively, be automatically determined based one or more of the: area 382, zone description 392, indication of the number of loads 394, fixture type 396, product type 388, and/or load type 390.

Turning now to FIGS. 4A-4F, these figures illustrate graphical user interfaces that may be displayed by the control/configuration application to display, automatically determine, and/or update the system configuration data for a load control system. Again, the computing device may be similar to the user device 109 and/or the computing device 280 as described herein and may be a personal computer (PC), a laptop, a tablet, a smart phone, or equivalent device, for example, although it may also be another type of computing device. The control/configuration application may be a graphical user interface (GUI) based application that may provide a GUI based interface/GUI based "window(s)" to a user via the computing device and may allow a user of the computing device to interact with, control, and/or configure control devices within a user environment (e.g., user environment 102) or load control system (e.g. the load control system 100). For description purposes, the load control system 100 of the user environment 102 and the communication systems described with respect to FIG. 1 may be used herein as an example load control system and communication system to describe the control/configuration application. Nonetheless, the features and functions of the control/configuration application described herein are applicable to other types of control devices, load control systems, and/or communication systems.

Referring to FIGS. 4A to 4F, there is shown example graphical user interfaces that may be displayed by the control/configuration application. As described herein, a user may interact with the graphical user interfaces to configure and/or control a load control system. For example, the graphical user interfaces may provide for the configuration and/or control of one or more lighting control devices in the load control system, for example, by defining one or more scenes. As described herein, a scene may include certain settings for one or more load control devices, lighting loads, motorized window treatments, and/or other load control devices and/or electrical loads in the load control system. And when a scene is activated (e.g., via a button press of a remote-control device or keypad, a sensor measuring event, a timeclock event, or another triggering event), one or more messages that include control instructions may be transmitted to control the respective devices in the load control system in accordance with the scene and the configuration settings defined therein.

Figure 4A:
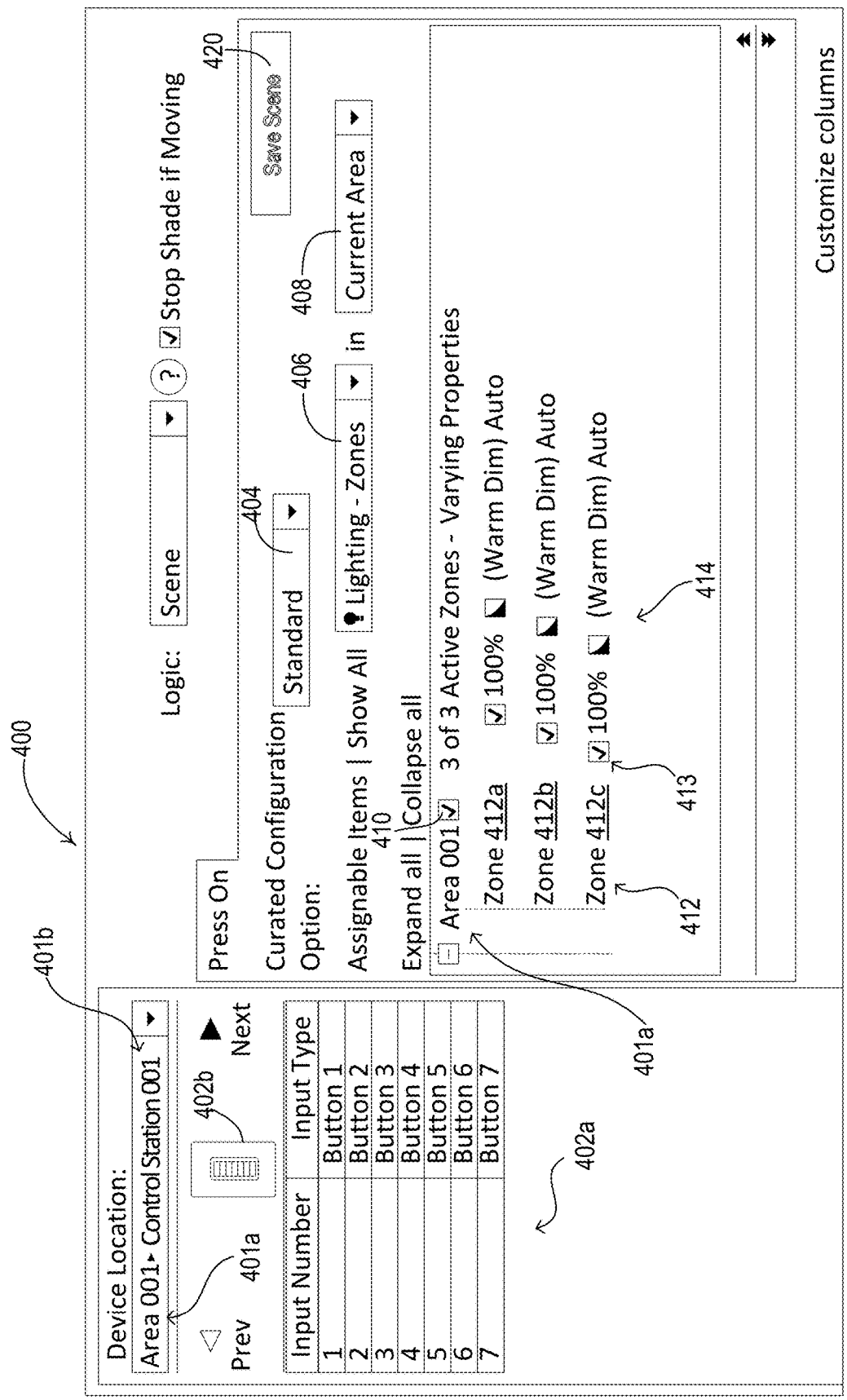
FIGS. 4A-4F show example graphical user interfaces of an application that may allow a user to determine scene information and to control a load control system and/or one or more load control devices.

Referring now to FIG. 4A, there is shown a graphical user interface 400 that may be displayed by the control/configuration application. The graphical user interface 400 may be displayed to a user via the computing device 280, for example. The graphical user interface 400 may be displayed by the control/configuration application after the devices in a load control system have been grouped or organized by their respective area in the user environment and assigned to an area and/or a zone (e.g., also shown and described herein with respect to FIG. 3D). For example, the system configuration data may be generated and stored during a commissioning procedure such that control devices may be associated with one another, one or more areas, and/or one or more zones. Scenes may be defined and/or predefined during the commissioning procedure and stored in the system configuration data, such that the control devices and/or configuration settings for the scenes may be displayed on the graphical user interface 400 using the control/configuration application. Referring again to the examples illustrated in FIGS. 3A-3D, scenes may also, or alternatively, be defined according to automatically determined curated configuration settings. For example, the curated configuration settings may be automatically determined based on the zone purpose and a selected curated configuration option.

The system configuration data may be accessed by the control/configuration application and displayed on the graphical user interface 400. The user may modify preconfigured scenes or create scenes by making selections on the user interface 400 and the control/configuration application may receive the user selections as input for updating the system configuration data in memory. Accordingly, although FIG. 4A illustrates one type of example graphical user interface that may be displayed by the control/configuration application, other types of graphical user interfaces may also, or alternatively, be displayed.

As described herein, the devices in a load control system may be grouped or organized by their respective area in a user environment and subsequently assigned to a zone (e.g., based on their function) in the system configuration data. As shown in FIG. 4A, an area 401a (e.g., "Area 0001) may be selected in the graphical user interface 400 for being controlled according to the scene. An input device 401b (e.g., "Control Station 001") that is associated with the area 401a may be selected for triggering the scene to control one or more zones of load control devices and/or electrical loads in the area 401a. Though a particular area may be provided as an example for being configured in the graphical user interface 400, the graphical user interface 400 may similarly allow the user to select an area type (e.g., kitchen, living room, bedroom, office, conference room, etc.) for being configured and each area having the associated area type in the system configuration data may be configured with the scene settings selected by the user, as described herein.

An input event 402a may be selected for defining the control that is performed in response to the selected input event. For example, as shown in FIG. 4A, the input event 402a may be a button press at the selected device 401b for triggering the scene in the area 401a. The user may select the input event 402a that is to be configured for triggering the scene (here Button 1), and subsequently define the type of control to be performed for the zones in the area 401a in response to the input event 402a. Each input event 402a may have an input number as a unique identifier of the input event for the input device 401b and/or an input type that indicates the type of input (e.g., button press, sensor measurement event, timeclock event, or other input event) to be provided. An icon 402b may be displayed to provide visual feedback to the user of the input device 401b being configured for triggering the scene in the area 401. In an example, the user may select the input event 402a for triggering the scene by selecting a button on the icon 402b. Though a button press is indicated as an example type of input that may be used as a triggering event for triggering a scene, the graphical user interface 100 may configure a scene to be triggered based on other inputs, such as a sensor measurement event, a timeclock event, or another input event.

In response to the selection of the area 401a (e.g., "Area 001"), the graphical user interface 400 may display zones 412 that are associated with the area 401a in the system configuration data. The zones 412 may each be displayed with a corresponding selection indicator 413 for being selected for being controlled in response to the selected input event 402a. The selection indicators 413 may each be selected or deselected for being assigned to the selected input event 402a in the system configuration data to enable control in response to the input event 402a. The graphical user interface 400 may include a selection indicator 410 for selecting or deselecting each of the zones being displayed for the area 401a. Though particular zones may be provided as an example for being configured in the graphical user interface 100, the graphical user interface 400 may similarly allow the user to select a zone purpose (e.g., task lighting, accent lighting, ambient lighting, etc.) for being configured and each zone having the associated zone purpose in the system configuration data may be configured with the scene settings selected by the user, as described herein.

The zones 412 being displayed may be filtered based on filtering criteria 406, 408. The filtering criteria 406 may be a zone purpose filter configured to filter the zones in the area 401a. The zones 412 may be displayed based on the zone purpose selected by the zone purpose filter. The filtering criteria 408 may be an area filter configured to filter the zones based on area. A "Current Area" may correspond to the selected area. However, zones in additional areas and/or having a zone purpose indicated by the filtering criteria 408 may be simultaneously configured based on user selections in the graphical user interface 400.

The graphical user interface 400 may display a dropdown menu that may be used to select a curated configuration options 404. As described herein, the selected curated configuration options 404 may allow the control/configuration application to automatically generate and/or display curated configuration settings 414 for each selected zone 412 in the area 401a. For example, zones 412a, 412b may be zones of lighting devices capable of performing full-color lighting control or color temperature lighting control and thereby be associated with a first control type, while zone 412c may be a zone capable of performing dimmable lighting control and thereby be associated with a second different control type. One of the curated configuration options 404 may be selected from a dropdown menu of a plurality of curated configuration options. Each of the curated configuration options 404 may be associated with curated configuration settings 414 for controlling the selected zones 412, which, as described herein, may depend on control type (e.g., product type and/or load type) of the zone. The curated configuration settings 414 may depend on a (e.g., automatically determined based on) zone purpose that is associated with each zone. Also, or alternatively, the curated configuration settings 414 may depend on one or more of: the area the zone description, the fixture type, the control type (e.g., the product type and/or the load type).

As described herein, the curated configuration settings 414 may be automatically determined based on the zone purpose and the curated configuration option 404. In addition, the curated configuration settings 414 will provide values for each of the available control parameters based on the control types for each of the respective zones 412. For example, the control types for zones 412a-c may indicate that the intensity, warm dim, and vibrancy control parameters may be capable of being controlled, and, as a result, the respective curated configuration setting 414 may include values for the intensity control parameter (e.g., 100%), the warm-dim curve parameter, and the vibrancy parameter (e.g., Auto) based on the curated configuration option 404 and/or the zone purpose.

In certain scenarios, the control/configuration application may automatically determine curated configuration settings 414 using the techniques described herein, and the curated configuration settings 414 may be provided to the user as a starting point for the user to configure the scene. Based on the user's preferences, the user may either accept and save the curated configuration settings 414, or adjust the curated configuration settings 414 as desired prior to saving.

Each zone 412 may comprise lighting loads and/or lighting control devices. As described herein (e.g., with respect to FIGS. 3C and 3D), each zone 412 may be assigned a respective zone purpose, which may be used to automatically determine respective curated configuration settings 414, for example, based on the selection of one of the curated configuration options 404. For example, the control/configuration application may identify the zone purpose for each selected zone 412, for example, from a dataset. The dataset may further include an indication of the control types for different types of lighting loads and/or lighting control devices in each of the selected zones 412. For example, different types of lighting loads and/or lighting control devices may be organized in the dataset according to a respective control type. The different control types may group together lighting loads and/or lighting control devices with similar lighting control features and/or capable of responding to the same parameters in commands that may be transmitted for performing control of similar features of the lighting loads and/or lighting control devices of a given control type. The control types may be defined or limited by the capabilities of the lighting load, and/or the pairing of the lighting load with the lighting control device that is controlling the lighting load.

The control/configuration application may identify the zone purpose for each of the zones 412 selected in the area 401a for being controlled according to the scene by looking at the control types of electrical loads and/or load control devices in the zones 412 (e.g., the product type and/or the load type). After the zone purpose is identified for each of the identified zones 412 in the area, the control/configuration application may automatically determine the curated configuration settings 414 for each of the selected zones based on the identified zone purpose, the curated configuration option 404, and/or the control type of the electrical loads and/or load control devise in the zones 412. In certain implementations, the curated configuration setting 414 may include predefined values for the available control parameters of devices in the zone, which, as described herein, are based on the respective control types of the devices. The predefined values may further be determined based on the zone purpose and/or the selected curated configuration option.

The control/configuration application may receive the selection of the zones 412 being configured via the selection indicator 413 and automatically determine the curated configuration settings 414 for each respective zone 412 for the selected curated configuration option 404. For example, based at least on the zone purpose of each zone 412 and the curated configuration option 404, the control/configuration may automatically determine curated configuration settings 414 and present them to a user, for example, via the graphical user interface 400. In certain implementations, the curated configuration settings may be accessed by the control/configuration application from memory and displayed on the graphical user interface 400. The curated configuration settings 414 may include predefined values for the curated configuration options 404 that are associated in memory with the zone purpose corresponding to each zone 412. The curated configuration settings 414 for each control type of a curated configuration option 404 may indicate a number of configuration settings and/or a value for each control setting to be provided for the control type. The curated configuration settings 414 for lighting control devices may include a predefined on/off state, a predefined lighting intensity value, a predefined color value, a predefined vibrancy value, a predefined color temperature value, and/or another predefined value corresponding to a controllable feature of the lighting control devices. The curated configuration settings 414 may also include fade rate (e.g., a period of time over which the load transitions to the curated configuration setting 414 or a delay in performing control at the load control device from the time of receiving the triggering event. For example, the curated configuration settings 414 for the lighting control devices may include a fade time or fade rate over which the lighting control is performed and/or a delay for waiting to perform the lighting control at the load control device after receiving the triggering event. As shown in FIG. 4A, zones 412a, 412b are color temperature lighting zones that have a predefined lighting intensity value and a predefined color temperature value displayed in the curated configuration settings 414 for the selected curated configuration option 404. The zone 412c is a dimmable lighting zone that has a predefined lighting intensity value displayed in the curated configuration settings 414 for the selected curated configuration option 404. Different control types may be assigned different configuration settings for each curated configuration option 404. For example, certain control types that are capable of implementing a fade or a delay may be defined with a fade time or delay time. After being presented with the curated configuration settings 414, the user may save the curated configuration setting. Also, or alternatively, the user may adjust the curated configuration settings 414 as desired prior to saving.

The curated configuration option 404 may be configured to provide a mood or setting in the user environment. For example, a curated configuration option 404 may be configured to increase productivity in the user environment and/or energy in the user (e.g., by turning lighting loads on, increasing lighting intensity values, controlling lighting loads to cooler colors or temperature values, such as 5,000-8,000 Kelvin, etc.). A curated configuration option 404 may be configured to increase relaxation in the user environment and/or relax the user (e.g., by turning lighting loads off, decreasing lighting intensity values, controlling lighting loads to warmer colors or temperature values, such as 2,500-4,500 Kelvin, etc.). The curated configuration option 404 may be configured to provide other moods or settings in the user environment. The curated configuration option 404 may also be configured to provide settings in the user environment based on activities (e.g., reading, cooking, bathing, etc.). For example, a curated configuration option 404 may also be configured provide the optimal light for reading, cooking, and taking a bath, respectively.

The selection of a curated configuration option 404 by the user may cause the control/configuration application to populate the graphical user interface 400 with the curated configuration settings 414 for each of the control types for the selected zones 412. The curated configuration settings 414 may be edited or updated by the user after being populated on the graphical user interface 400. For example, the user may select a curated configuration option 404 as a starting point for configuring the configuration settings for the scene and the user may update/change the configuration settings in the graphical user interface 400.

The user may select different curated configuration options 404 to populate different curated configuration settings 414 on the graphical user interface 400. For example, as shown in FIG. 4A, the control/configuration application may receive the selection of a "Standard" curated configuration option 404 and populate the curated configuration settings 414 for zones 412a, 412b with a lighting intensity value (e.g., 100%) and color temperature value (e.g., warm dim setting) that may be configured to control a lighting load(s) via a lighting control device to the lighting intensity value and color temperature value in response to Button 1 being pressed. In response to the "Standard" curated configuration option 404, the control/configuration application may populate the curated configuration settings 414 for zone 412c with a lighting intensity value (e.g., 100%), as the zone 412c may be a dimmable lighting zone in response to Button 1 being pressed.

Figure 4B:
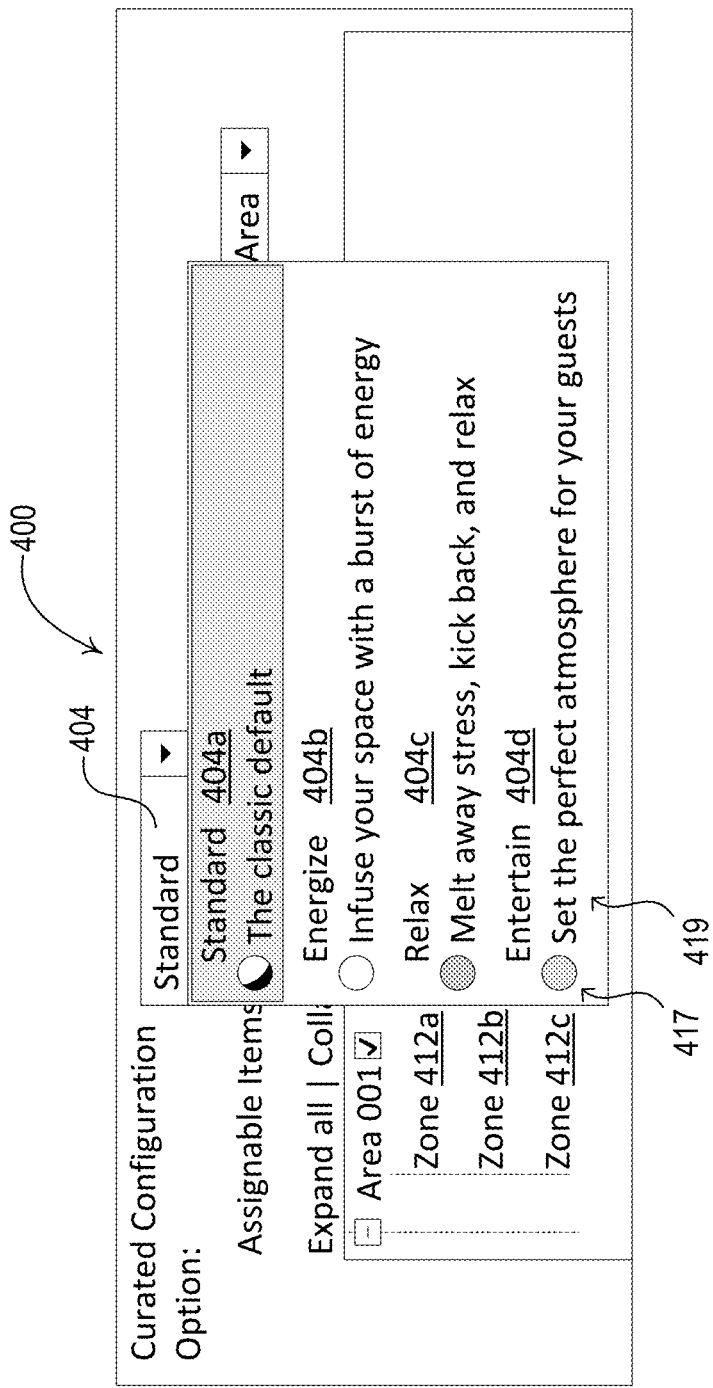

As shown in FIG. 4B, the user may select different curated configuration options 404a (e.g., "Standard"), 404b (e.g., "Energize"), 404c (e.g., "Relax"), 404d (e.g., "Entertain") to populate different curated configuration settings 414 on the graphical user interface 400 for the control types for each zone 412. For example, the user may select a dropdown box to cause the control/configuration application to display the curated configuration options 404a, 404b, 404c, 404d for user selection. Though specific curated configuration options 404a, 404b, 404c, 404d may be illustrated, other types of curated configuration options for configuring configuration settings for the selected zones may be provided. Each of the curated configuration options 404a, 404b, 404c, 404d may be displayed with a corresponding icon 417 and/or description to provide feedback to the user of the characteristics of the configuration settings to be set by the curated configuration option. The icon 417 may indicate a preview of the control to be performed. For example, the icon 417 may illustrate an approximate range of color, color temperature, and/or intensity of lighting loads that may be controlled by the curated configuration settings 414 for the respective curated configuration option. Here, the curated configuration option 404a (e.g., Standard) is selected.

Figure 4C:
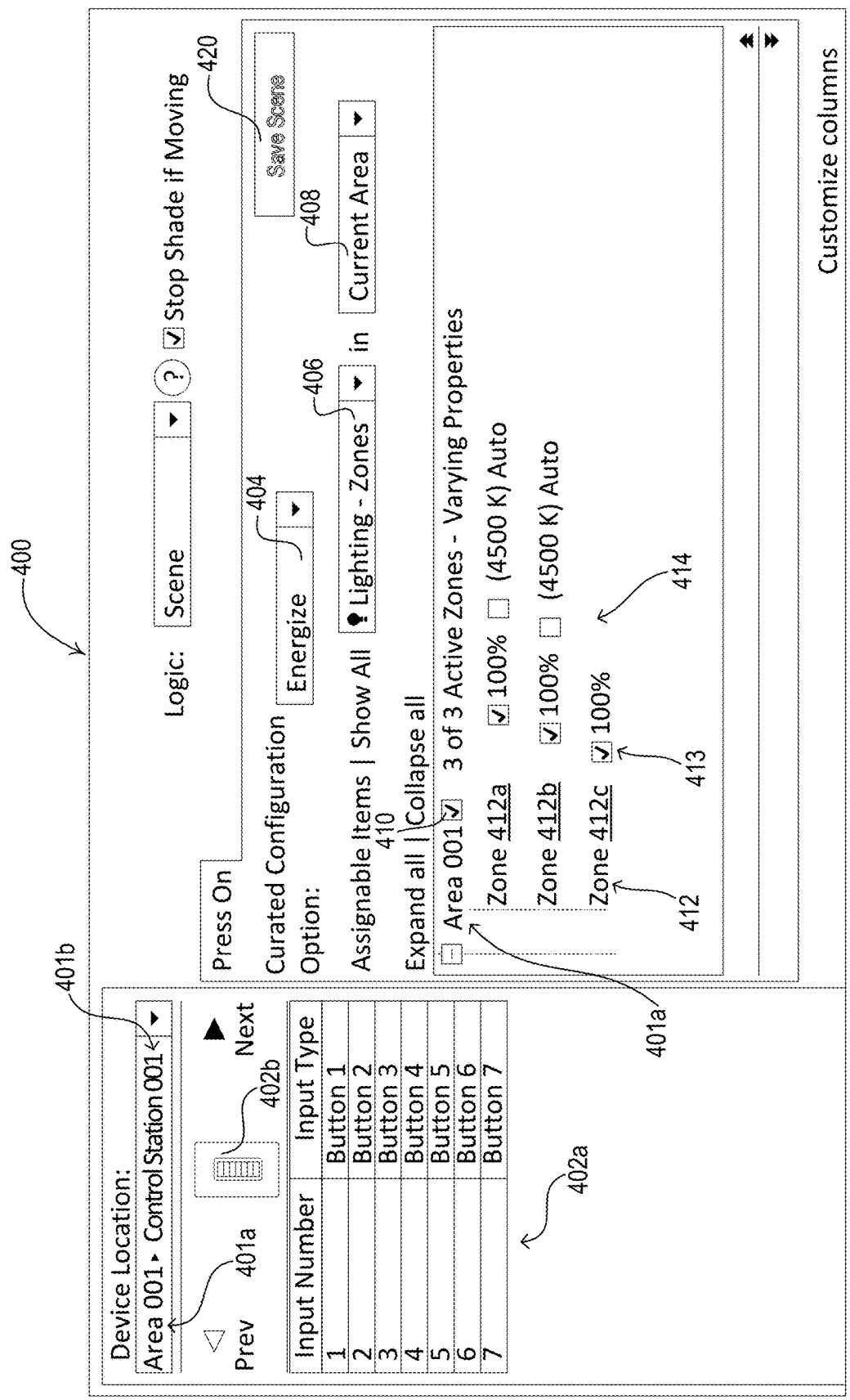

FIG. 4C shows another example state of the graphical user interface 400 after the user has selected another curated configuration option 404 (e.g., the Energize curated configuration option 404b of FIG. 4B). As the user has selected another curated configuration option 404 (e.g., "Energize"), the control/configuration application may receive the selection and update the curated configuration settings 414 for each of the selected zones 412 based on the selected curated configuration option 404. Again, the curated configuration settings 414 may be automatically determined based on the zone purpose and the curated configuration option 404. In addition, the curated configuration setting 414 will provide values for each of the available control parameters based on the control types for each of the respective zones 412. For example, the control types for zones 412a, 412b may indicate that the vibrancy control parameter and the intensity control parameters may be capable of being controlled, and, as a result, the respective curated configuration setting 414 may include values for the vibrancy control parameter (e.g., 4500K) and the intensity control parameter (e.g., 100%) based on the curated configuration option 404 and/or the zone purpose. Similarly, the control type for zone 412c may indicate that only the intensity control parameter is available, and the curated configuration parameters 414 for zone 412c may only include values for the lighting intensity parameter (e.g., 100%).

As shown in FIG. 4C, the control/configuration application may identify the control type for each of the zones 412a, 412b, 412c. The control/configuration application may identify that the control type for zones 412a, 412b allows for color temperature lighting control and dimmable lighting control for the lighting loads in the zones and set the curated configuration settings 414 accordingly. The curated configuration setting 414 for the zones 412a, 412b may be set to an intensity value of 100% and a color temperature value of 4500K based on the control type for the zones 412a, 412b and the curated configuration option 404. The control/configuration application may identify that the control type for zone 412c is limited to dimmable lighting control for the lighting loads in the zone and may set the curated configuration settings 414 accordingly. The curated configuration setting 414 for the zone 412c may be set to an intensity value of 100% based on the control type for the zone 412c and the curated configuration option 404. As described herein, the control/configuration application may determine the control type assigned to zone 412c, e.g., based on the system configuration data (e.g., product type and/or load type).

Although the examples illustrated in FIGS. 4A-4C related to automatically determining curated configuration settings for a scene, it should be appreciated that curated configuration settings may be automatically determined for other presets, such as, a natural show and/or warm-dim curve. For example, using the techniques described herein, curated configuration settings may be automatically determined for a natural show and/or warm-dim curve based on a selected curated configuration option, a zone purpose, control type, area, location, fixture type, etc.

Figure 4D:
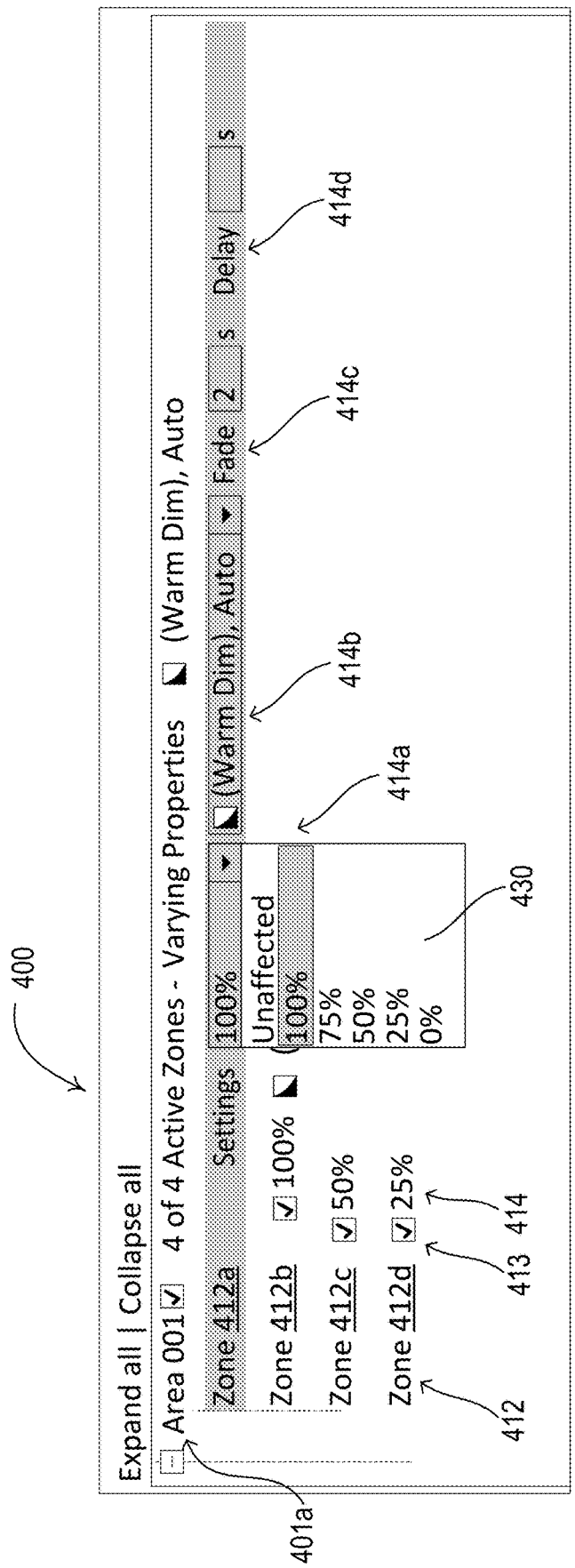
Figure 4E:
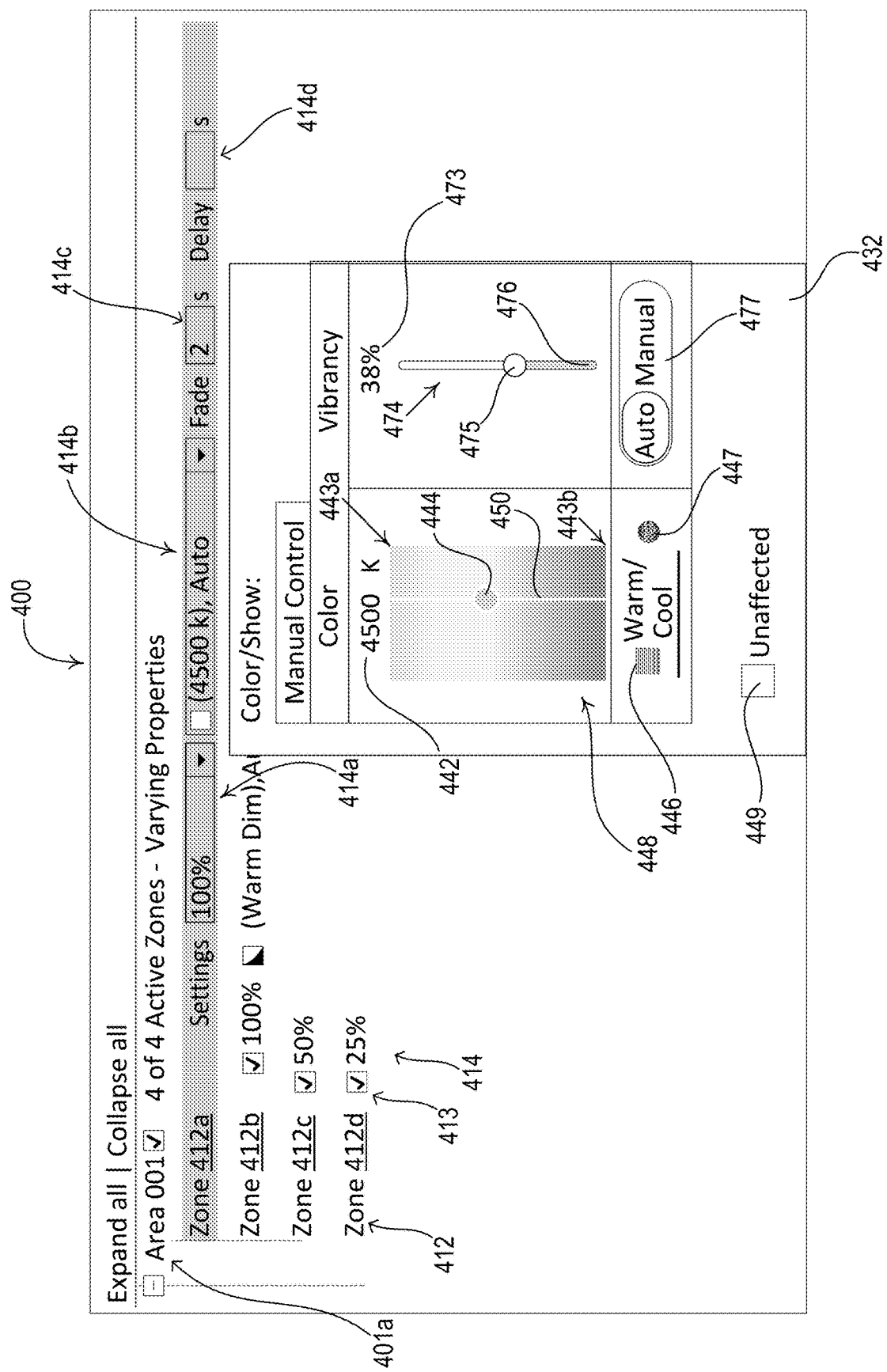
Figure 4F:
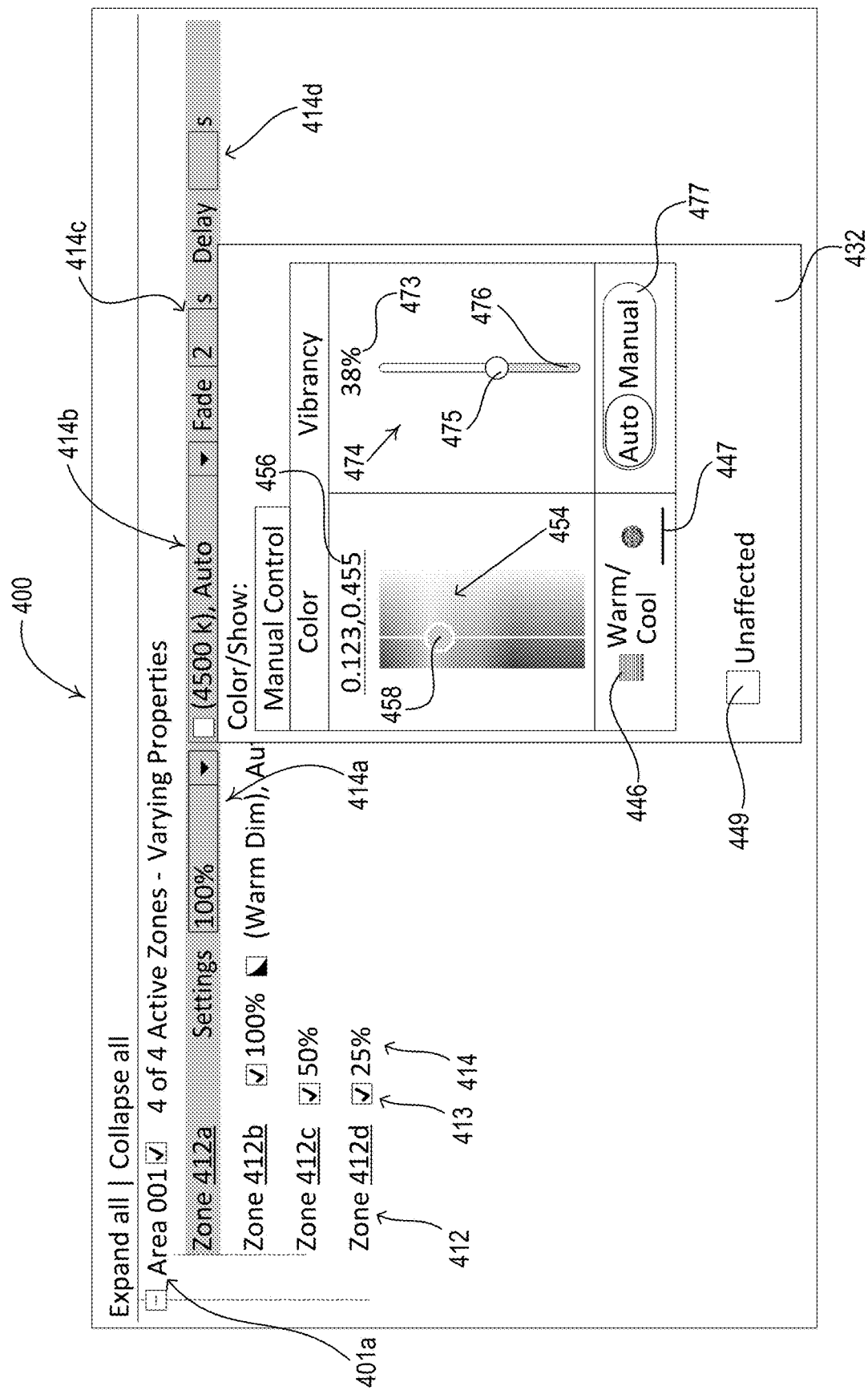

The graphical user interface 400 may allow the user to manually adjust the curated configuration settings 414 once the curated configuration settings are configured. FIGS. 4D, 4E, and 4F show a zoomed-in view of a portion of the graphical user interface 400 that illustrates a state of the graphical user interface 400 during manual adjustment of the configuration settings 414. The selected curated configuration settings 414 for the selected curated configuration option 404 for the control type may act as a starting point for the user to configure the control of the zones 412, as the user may perform manual adjustment of the configuration settings 414 populated by the selected curated configuration option 404. As shown in FIG. 4D, the user may select one of the zones 412, such as zone 412a, and the control/configuration application may identify the selected zone 412a on the graphical user interface 400 for being manually updated (highlighted in FIG. 4D). The user may select one or more of the configuration settings 414 that correspond to the selected zone 412a to adjust the value to which the configuration setting is controlled in response to activation of the scene (e.g., user selection of Button 1 on the keypad). For example, the user may select a lighting intensity setting 414a and change the lighting intensity value of the lighting intensity setting 414a from the current lighting intensity value of 100% to another percentage for controlling the lighting intensity setting 414a in response to the triggering event for the scene. The control/configuration application may identify the selection of the lighting intensity setting 414a and display a lighting intensity control interface 430 with other lighting intensity values for being selected on the graphical user interface 400. As an example, the lighting intensity control interface 430 may be a drop-down menu with predefined lighting intensity values that may be selected by the user for being received by the control/configuration application. In another example, the lighting intensity control interface 430 may include a text box or other interface for a user to enter the lighting intensity value for the lighting intensity setting 414a. As shown in the lighting intensity control interface 430, the user may also be able to select that the lighting intensity value 412a is unaffected when the scene is triggered, which may allow the lighting loads in the zone to maintain their current intensity level when the scene is triggered.

As shown in FIG. 4E, the user may adjust a value for a color setting 414b. The color setting may comprise a color temperature value for the color temperature setting of the selected zone 412a or a full color value for a full color setting. The control/configuration application may identify the selection of the color setting 414b and display a color control interface 432 on the graphical user interface 400. The color control interface 432 may be displayed by the control/configuration application to control the warm or cool color temperature defined by the zone 412a (e.g., because the lighting control devices and/or lighting load assigned to the zones are capable of color functionality and/or color control, as described herein).

The color control interface 432 may include an indicator 442, a palette 448, an actuator 444, and/or a control line 450. The palette 448 may show a range of colors ranging from cool colors 443a at the top of the palette 448 to warm colors 443b at the bottom of the palette 448. As described herein, these colors may correspond to colors that lie along the black body locus. For example, the palette 448 may show colors along a range of correlated color temperatures (CCTs) ranging from "warm white" (e.g., roughly 2600 Kelvin-3700 Kelvin) at 443b, to "neutral white" (e.g., 3700 Kelvin-5000 Kelvin) to "cool white" (e.g., 5000 Kelvin-8300 Kelvin) at 443a. As one example, the range correlated color temperatures may be from 1400 Kelvin to 7000 Kelvin, although other examples are possible.

Superimposed over the palette 448 may be an actuator 444. The actuator 444 may be movable/slide-able (e.g., here vertically movable) along the control line 450 to select different CCTs along the black body locus. Accordingly, actuator 444 may allow a user to configure the lighting control device(s) such that the lighting load(s) of the zone 412a produces colored light at a color point along the black body locus in response to the triggering event for the scene. Similarly, indicator 442 may also display the corresponding color. The actuator 444 may appear once the user interacts with palette 448.

The color control interface 432 may include vibrancy controls that may be used to select the vibrancy settings for controlling the lighting loads in the zone 412a in response to the triggering event for the scene. The vibrancy controls may include an "Auto/Manual" actuator 477. If, for example, the "Auto/Manual" actuator 477 is set to "Manual," the lighting devices in the zone may be configured to the manual vibrancy state/mode and the vibrancy box 473 may include an indicator that displays the selected vibrancy value. The color control interface 432 may include a vibrancy bar 474. For example, the vibrancy bar 474 may include an actuator 475 and/or a control line 476. The actuator 475 may be superimposed over the control line 476. The actuator 475 may be movable/slide-able (e.g., here vertically movable) along the control line 476 to select different vibrancy values along the control line 476. The vibrancy box 473 may include a text box that allows the user to input the vibrancy value and/or that reflects the vibrancy value selected by the user with the actuator 475. As described herein, when the vibrancy is set to "Manual", the user may adjust the vibrancy settings (e.g., the intensity/contribution of the white LED(s)), and when the Vibrancy is set to "Auto" the CRI value of the emitted light may be optimized towards or above a threshold CRI value.

Increasing/decreasing vibrancy value for the vibrancy parameter using the vibrancy bar 474 when in the manual vibrancy state/mode may increase/decrease the apparent saturation of the color of objects in the space without changing (or substantially without changing) the color point of the lighting control devices. Moving the actuator 475 upwards along the vibrancy bar 474 may increase the vibrancy value of the vibrancy parameter for controlling the lighting control devices for a selected color/CCT as the color changes over time. As the vibrancy value of lighting control devices is increased, the contribution of the white, or substantially white, LED(s) (e.g., yellow and/or mint green LED) of the lighting loads may decrease (e.g., given a certain color point and/or correlated color temperature), while increasing the intensity, and thus the contribution, of one or more of the RGB LEDs to maintain the color point while increasing saturation. Similarly, moving the actuator 475 downwards along the vibrancy bar 474 may decrease the vibrancy value of the vibrancy parameter for controlling lighting control devices. In addition, as the vibrancy value of the lighting control devices is decreased, the contribution of the white, or substantially white, LED(s) of the lighting control devices may increase (e.g., given a certain CCT) and correspondingly decreasing the intensity of one or more of the RGB LEDs. The configured vibrancy value may be stored by the control/configuration application for then being applied to the lighting loads in the zone 412a in response to the activation of the scene.

As shown in FIG. 4E, the "Auto/Manual" actuator 477 may be set to "Auto." When the "Auto/Manual" actuator 477 is set to "Auto," the lighting control devices may be configured to the manual vibrancy state/mode and the control/configuration application may automatically configure the CRI value of the lighting control devices based on the selected color. The control/configuration application may automatically configure the CRI value of the lighting control devices such that the CRI values of the light emitted in the zone is optimized (e.g., optimizing the CRI value towards or above a threshold CRI value based on the desired color). For example, the control/configuration application may adjust the CRI value of the zone 412a such the CRI value of the emitted light is optimized towards or above a threshold CRI value. In certain instances (e.g., for certain color point or correlated color temperature) the CRI value may be unable to be a value that is greater than or equal to the CRI threshold value. In those instances, the "Auto/Manual" actuator 477 being set to "Auto," may cause the lighting loads to increase the CRI value towards (e.g., as close as possible to) the CRI threshold value.

In certain scenarios, increasing the CRI value to be greater than or equal to the CRI threshold value (e.g., setting "Auto/Manual" actuator 477 to "Auto") may automatically change the vibrancy. As a result, when the "Auto/Manual" actuator 477 is set to "Auto" the vibrancy of the lighting loads in a zone may automatically increase and/or decrease, in other words the vibrancy of the lighting loads may be automatically determined and/or may not be configurable by the user. For example, the control line 476 and vibrancy bar 474 may be disabled (e.g. grayed out and/or non-configurable as indicated in FIG. 4E) when the "Auto/Manual" actuator 477 is set to "Auto," and may be enabled when the "Auto/Manual" actuator 477 to "Manual."

The zone 412a may be capable of color temperature control and/or full color control. As such, the scene may be configured to provide for color temperature control and/or full color control of the respective zone 412a, and the control/configuration application may provide the user with the ability to configure the color temperature settings and/or full color settings defined by the scene. As shown in FIGS. 4E and 4F, the configuration/control application may display a warm/cool color tab 446 and a full color tab 447 for zones comprising control types that are capable of color temperature control and full color control. As shown in FIG. 4E, selection of the warm/cool color tab 446 may cause the control/configuration application to display a palette 448 in the color control interface 432 to allow the user to define warm/cool color temperatures for the lighting control devices in the zone 412a. Selection of the full color tab 447, however, may display the palette 454 shown in FIG. 4F, which provides colors available for full color control. The control/configuration application may identify the lighting loads and/or control type for the respective zones to provide the relevant configuration options in the color control interface 432. For zones of lighting loads that are capable of color temperature control, without full color control, the palette 448 may be displayed without the ability to configure full color control.

Referring now to FIG. 4F, the control/configuration application may display the palette 454 in the color control interface 432 of the graphical user interface 400 (e.g., in response to the selection of the full color tab 447) to allow for configuration of the full color control in the zone 412a for the respective scene. The color control interface 432 may include the palette 454 showing a plurality of colors that lie within the color gamut formed by the various RGBW LEDs, for example, that make up the one or more lighting loads in the defined zone 412a and are available for full color control. Similar to selecting a certain correlated color temperature, a user may select a location within the color palette 454 to define a color to which the corresponding zone 412a may be controlled in response to the triggering event for the scene being configured. As illustrated in FIG. 4F, the color palette 454 may include a plurality of colors that lie within the color gamut formed by the various RGBW LEDs, for example, that make up the lighting load(s) such that different color bands are displayed from top to bottom (e.g., red, yellow, green, teal, blue, purple, etc.). The color palette 454 may be displayed such that a user may select the x-y chromaticity coordinates corresponding to a given color. The color palette 454 may include white colors on the far-right side of the color palette 454, though the white colors may be located in other areas of the color palette 454.

The control/configuration application may identify a user selection on the color palette 454. Superimposed over the palette 454 may be an actuator 458 that identifies a user selection within the color palette 454. The actuator 458 may be movable/slide-able (e.g., up, down, left, right, etc.) by the user to any of a plurality of locations/colors within palette 454. The graphical user interface 400 may display together with actuator 458 two perpendicular control lines that intersect at the center of the actuator 458. These control lines and the intersection point may move with the actuator 458 as it is moved by a user within palette 454, or as the user selects another location within the palette 454 independently. These control lines may assist the use in moving actuator 458 either horizontally or vertically or diagonally, etc. Accordingly, actuator 458 may allow a user to configure the zone 412a such that the zone 412a produces colored light at a color point that lies within the color gamut formed by the various RGBW LEDs, e.g., that make up the one or more lighting loads of the defined zone 412a.

The color gamut formed by the various RGBW LEDs that make up the lighting loads may be referenced using an x-y chromaticity coordinate system. Accordingly, the control interface 452 may include a coordinate indicator 456. The coordinate indicator 456 may illustrate the x-y chromaticity coordinates of the selected color. For example, referring to FIG. 4F, the color selected for the zone 412a may be indicated by the x-y chromaticity coordinates [0.123, 0.455].

Upon the full color tab 421b being actuated by a user from color control interface 432, or prior to the color being defined for the zone 412a, the control/configuration application may initially display control interface 454 without actuator 458 and without the control lines. Upon the user performing a selection within the palette 454, the graphical user interface 400 may display actuator 458 and the control lines at a relative point within palette 454 to indicate the color being defined and/or to be produced by the one or more lighting loads within the zone 412a.

As shown in FIGS. 4E and 4F, additional configuration settings for a scene may be manually configured for controlling one or more zones according to the scene. The additional configuration settings may also include curated configuration setting (e.g., as described herein) and/or may be adjusted by the user. For example, a fade time may be configured for the fade setting 414c. The fade time may define the period of time over which the loads in the zone transition to the configuration settings defined by the scene. The fade time may be entered into a text box or another input may be provided from the user to the control/configuration application via the graphical user interface 400 for configuring the fade time for the fade setting 414c. The delay time may be entered into a text box or another input may be provided from the user to the control/configuration application via the graphical user interface 400 for configuring the delay time for the delay setting 414d. The delay time may define the period of time until which the loads in the zone begin to transition to the configuration settings defined by the scene.

The color control interface 432 may include an affected/unaffected selector 449. The affected/unaffected selector 449 may be actuated by the user to select that whether the color or color temperature of the lighting loads in the zone 412a is affected by the triggering of the scene. If the color or color temperature is chosen to be unaffected when the scene is triggered, the lighting loads in the zone 412a may maintain their current color and/or color temperature when the scene is triggered (e.g., when Button 1 of the keypad is selected).

Though the zone 412a is provided as an example that is illustrated for manual configuration, each of the curated configuration settings 414 corresponding to a zone 412 may be similarly configured and/or updated using the manual configuration. For example, the manual configuration may be performed to adjust the settings populated by the selection of a curated configuration option 404. The user may similarly return to a curated configuration option by selecting a curated configuration option 404, as shown in FIGS. 4A-4C.

Referring again to FIG. 4C, after the user has configured the curated configuration settings 414 for each of the zones 412 (e.g., by selecting a curated configuration option 404 and thereafter possibly performing manual adjustment to the curated configuration settings), the user may select the save button 420 to save the scene to the system configuration data. The control/configuration application may store the curated configuration settings 414 in memory for each of the selected zones 412 and/or the selected area 401a for being controlled according to the curated configuration settings 414 in response to the selected input 402a from the input device 401b (Button 1). The save button 420 may save the curated configuration settings 414 to the area 401a that have been defined in the load control system. The settings of the defined scene may be saved in the system configuration data to update the system configuration data for enabling control according to the defined scene.

The scenes defined for the load control system (e.g., or a certain area in the load control system) may be stored and/or maintained at a single device (e.g., a system controller or remote computing device) or across multiple devices (e.g., the system controller, the remote computing device, the user device, and/or one or more control devices, such as input devices and load control devices). When a scene is selected, one or more messages that include control instructions to control the loads as defined by the scene may be transmitted. For example, the control instructions may include the configuration settings, or may be based on the configuration settings, of the defined scene. The scenes (e.g., and their respective configurations) may be communicated to a system controller or other central processing device (e.g., the remote computing device). Each of the scenes may be separately configurable and/or programmable via a graphical user interface provided by the control/configuration application.

After configuration, a scene may be activated via a triggering event at a graphical user interface or a control device, such as the remote-control device 170 and/or keypad. For example, as described herein, the control device may include one or more buttons, each of which may correspond to a configured scene. The scene may then be activated by actuating (e.g., pressing) the button that corresponds to that scene. Upon activation, the configurations defined for the scene may be retrieved from memory at the remote-control device 170 and/or keypad or the actuation of the button may be signaled to another device, such as a system controller, and the device that receives the indication that the button has been actuated may retrieve the configurations from memory. Also, or alternatively, the configurations for the scene, or portions thereof, may be stored and retrieved from multiple devices. For example, part of the configuration for a scene may be stored and retrieved from the system controller, and another part of the configuration for the scene may be stored and retrieved from the control device and/or the load control device(s)/lighting control device(s) themselves. After the configuration for the scene has been retrieved, one or more messages including control instructions may be transmitted to control one or more load control devices based on the configuration of the scene.

Figure 5:
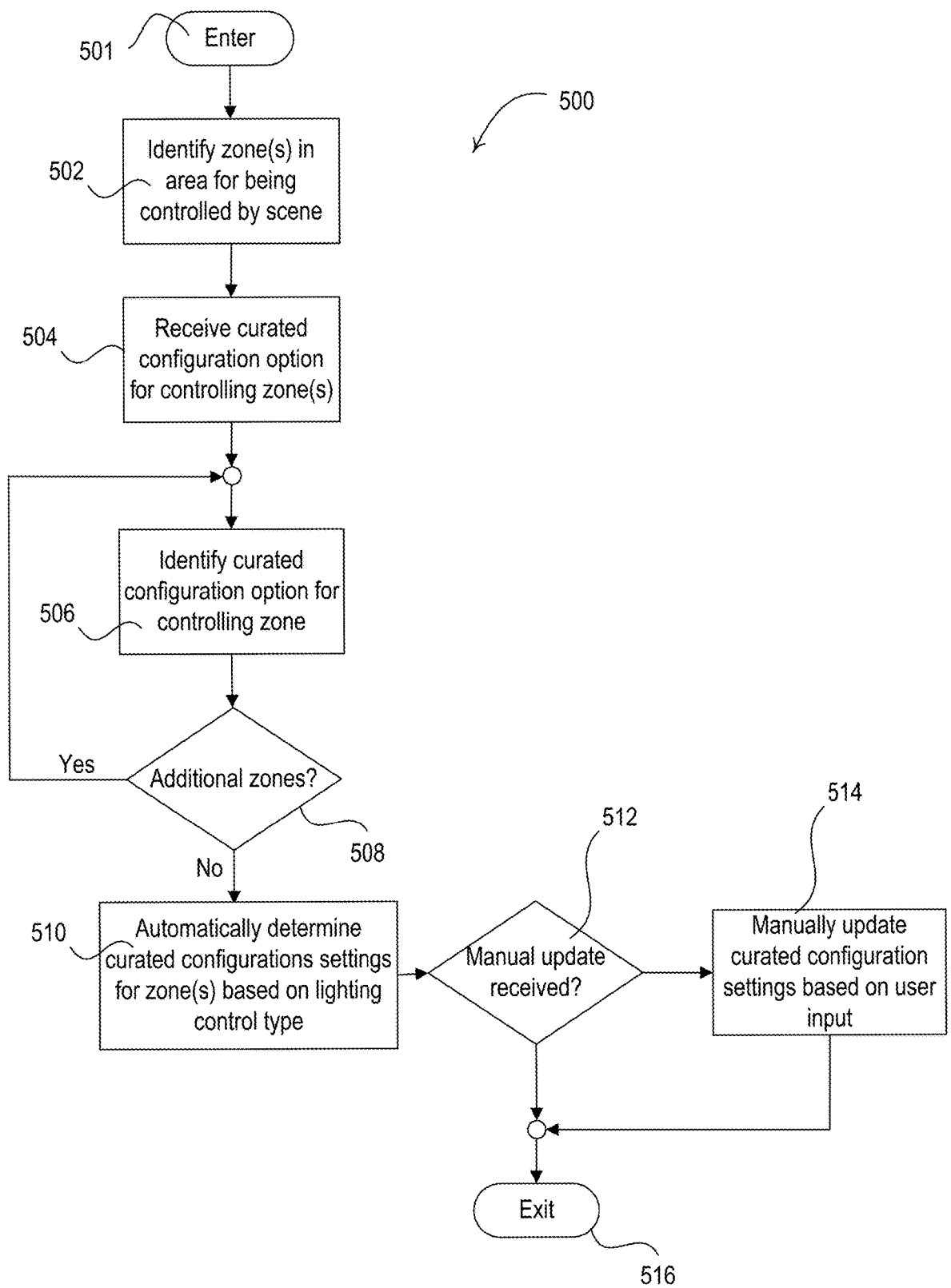
FIG. 5 is a flowchart depicting an example procedure for configuring control settings for a scene and/or a preset.

FIG. 5 is a flow diagram of an example procedure 500 for defining a scene using curated configuration settings for controlling one or more zones in an area of a load control system. The procedure 500 may be performed to generate and/or update system configuration data from which a load control system is configured and/or controlled. For example, the procedure 500 may be performed at 306-310 of the procedure 300 of FIG. 3A to define and/or update configuration settings for one or more scenes for controlling one or more electrical loads and updating the system configuration data with the configuration settings for the scenes. Also, or alternatively, the procedure 500 may be performed at 370-376 of the procedure 360 of FIG. 3C to automatically determine and/or update curated configuration settings for one or more scenes for controlling one or more electrical loads.

The procedure 500 may be performed by a control/configuration application, such as the control/configuration application 203, and may enter at 501. As described herein, the control/configuration application may be executed by the control circuit of a computing device, such as the control circuit 202 of the computing device 280, for performing one or more portions of the procedure 500. For example, the procedure 500 may enter at 501 in response to an indication from a user to update the system configuration data with configuration settings for one or more scenes in a load control system (e.g., via a computing device executing the control/configuration application, such as the user device 190, system controller 110, and/or computing device 111 of FIG. 1, or the computing device 280 of FIG. 2). In an example, the procedure 500 may enter at 501 in response to an indication from the user to define configuration settings for one or more scenes for controlling one or more electrical loads.

At 502, the control/configuration application may identify one or more zone(s) defined in an area for being controlled. The zones in the area may be defined in the system configuration data that is received by the control/configuration application. As described herein, the system configuration data may associate each area with one or more zones. Each zone may include at least one electrical load capable of being controlled by a load control device. The control/configuration application may receive the system configuration data and display one or more areas to the user. In response to a user selection of an area, the control/configuration application may display the one or more zones that are defined for the selected area. As described herein, one or more zones within an area may be selected by a user indication for being configured for being controlled in the scene. In an example, the user may select one or more zones for being controlled in response to a triggering event (e.g., button press, sensor measurement event, timeclock event, or another triggering event) for the scene being defined.

At 504, the control/configuration application may receive an indication of a user selection of a curated configuration option for controlling the identified zones in the area. For example, the curated configuration option may be selected from a dropdown menu of a plurality of curated configuration options. As described herein, curated configuration settings may be automatically determined in response to the receipt of the curated configuration option for controlling the electrical loads and/or load control devices in the selected zones.

At 506, the control/configuration application may identify a curated configuration option for controlling the identified zones in the area. After the control/configuration application receives the indication of the curated configuration option for controlling the identified zones, the control configuration application may identify/determine from the configuration data a respective control type for controlling each of the identified zones, such that the curated configuration settings for the appropriate control type may be automatically for the selected curated configuration option. The control/configuration application may identify the control type for the lighting load and/or lighting control device defined for each zone. For example, the control configuration application may identify the control type based on the load type and/or the product type of the control device(s) defined for each zone. The control/configuration application may access a dataset (e.g., in the system configuration data or separately stored in memory) of control types for different devices. For example, different types of load types and/or product types of lighting control devices may be grouped in the dataset according to a respective control type. The control types may be identified in the dataset by a unique identifier (e.g., product identifier, feature identifier, manufacturer identifier, and/or other unique identifier). The different control types may group devices (e.g., lighting loads and/or lighting control devices) with similar load control features together. Similarly, the control types may group lighting loads and/or lighting control devices that are responsive to similar control parameters in commands that may be transmitted for performing control of similar features of the lighting loads and/or lighting control devices. The control types may be defined or limited by the capabilities of the respective device (e.g., the lighting load, and/or the pairing of the lighting load with the lighting control device that is controlling the lighting load). For example, a lighting load may be capable of color control, but the dimmer that is configured to control the lighting load may be limited to dimming control. As a result, the control type may be limited by the capabilities of the dimmer. This information may be indicated in the control type.

After the control/configuration application identifies the control type for a selected zone in the area by looking at the devices in the selected zones, the control/configuration application may determine, at 508, whether there are additional zones in the area selected for the given curated configuration option. If there are additional zones that have been selected at 508, the procedure 500 may return to 506 to identify the control type for controlling next selected zone.

After the control type is identified for each of the zones in the area for the scene being configured, the control/configuration application may automatically determine curated configuration settings for each zone based on the identified control type at 510. The curated configuration settings may also be automatically determined based on a zone purpose defined in the configuration data for the identified zone. As described herein, the curated configuration settings will provide values for each of the available control parameters based on the control types for each of the respective zones. For example, each curated configuration option may have settings that correspond to each control type. For example, as shown in FIGS. 4A and 4C, a "Standard" curated configuration option or an "Energize" curated configuration option may have different curated configuration settings for zones capable of dimmable lighting control than for zones capable of full-color lighting control or color temperature lighting control. As described herein, the number of settings and the value of the settings may be defined for each control type. For example, the curated configuration settings for each curated configuration option may be automatically determined from a predefined dataset for each control type. TABLE 1 below illustrates an example table or dataset that defines example curated configuration settings configurations for each control type.

TABLE 1

| Curated Configuration Option | Control Type 1 | Control Type 2 | Control Type 3 |
|---|---|---|---|
| Standard | CCT: 3400K; Intensity 80% | Intensity: 95% | On |
| Energize | CCT: 5000K; Intensity 80% | Intensity: 95% | On |
| Relax | CCT: 3400K; Intensity 25% | Intensity: 25% | Off |
| Entertain | CCT: 5000K; Intensity 25% | Intensity: 95% | On |
| Romance | CCT: 2800K; Intensity 20% | Intensity: 20% | Off |

As illustrated in TABLE 1, each control type may have one or more parameters for controlling a feature of the lighting loads having the corresponding control type when the corresponding curated configuration option is selected. Each curated configuration option may include settings for each parameter capable of being used to control features of the lighting loads in the zones having the corresponding control type. Different datasets may be stored for each zone purpose to allow for selection of different curated configuration options depending on the zone purpose for the zone. As described herein, the information in TABLE 1 may be stored in a databased (e.g., the database 111b in FIG. 1) and/or may be accessed via a computing device (e.g., the computing device 111) via the cloud (e.g., the cloud 111a).

Referring again to FIG. 5, the control/configuration application may display the automatically determined curated configuration settings at 510 to a user. The control/configuration application may determine whether a manual update to the settings has been received at 512. For example, the control/configuration application may allow the automatically determined curated configuration settings to be updated in response to use input. If the control/configuration application does not receive a manual update from the user at 512, the control/configuration application may update the system configuration data by storing the automatically determined curated configuration settings in response to an indication from a user to enable control in response to the triggering event for the scene. In another example, the curated configuration settings that are displayed may operate as a starting point for the user to begin updating the configuration settings manually and the control/configuration application may update the system configuration data by storing the manually updated configuration settings in response to the user input received at 514. The stored configuration settings may enable control in response to the triggering event for the scene. The procedure 500 may end at 511.

The updated system configuration data comprising the added or update scenes may be used to control one or more electrical loads as described herein. For example, the updated system configuration data may be implemented for performing control of one or more electrical loads as described with reference to the procedure 350 illustrated in FIG. 3B. The updated system configuration data may be uploaded to a system controller, a remote computing device, a user device, and/or one or more control devices in the load control system for enabling load control in response to the system configuration data. For example, the system configuration data may be uploaded to the system controller that is capable of receiving the indication of the triggering event for enabling the scene and the system controller may transmit messages to the load control devices in the scene for performing control according to the configuration settings defined in the scene.

Although the example procedure 500 related to automatically determining curated configuration settings for a scene, it should be appreciated that curated configuration settings may be automatically determined for other presets, such as, a natural show and/or warm-dim curve. For example, using the techniques described herein, curated configuration settings may be automatically determined for a natural show and/or warm-dim curve based on a selected curated configuration option, a zone purpose, control type, area, location, fixture type, etc.

Figure 6:
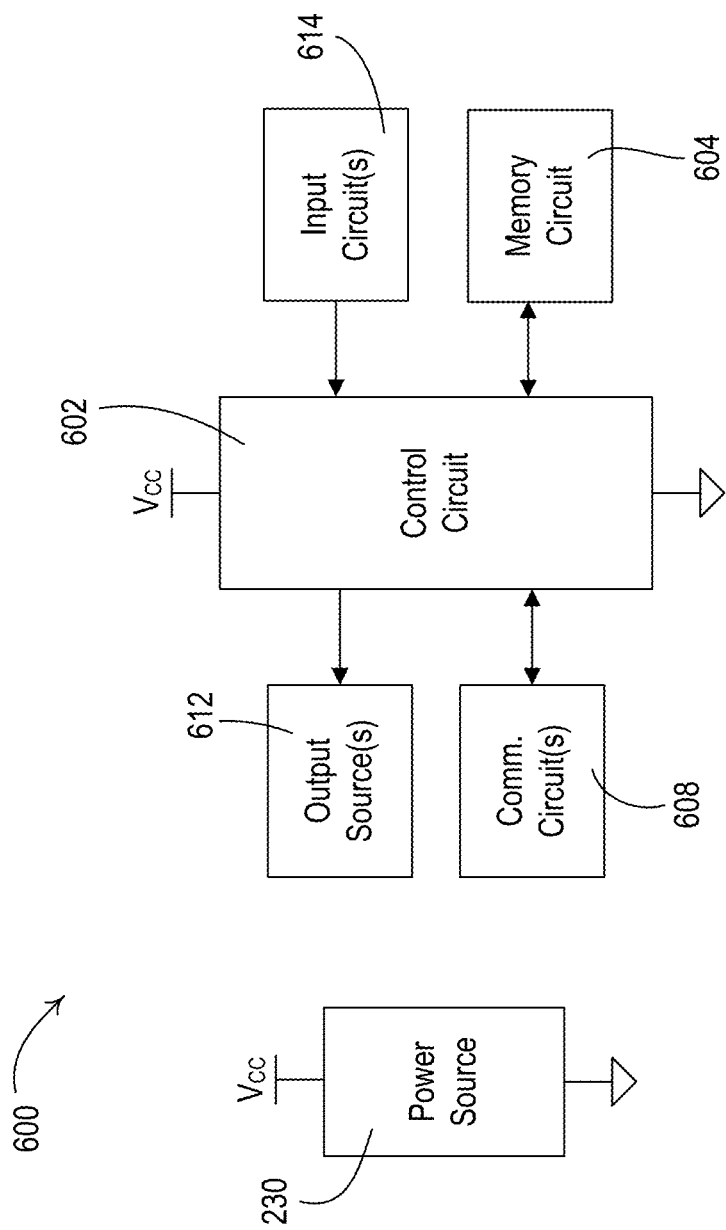
FIG. 6 is a block diagram of an example input device.

FIG. 6 is a block diagram illustrating an example of an input device 600 capable of operating in a load control system, such as the load control system 100 of FIG. 1. In an example, the input device 600 may be capable of transmitting or receiving messages. The input device 600 may be a sensor device (e.g., an occupancy sensor, a daylight sensor, a temperature sensor, an ambient light sensor, a color temperature sensor, a visible light sensor, or another sensor device), a remote control device, or another input device capable of transmitting messages to load control devices or other devices in the load control system.

The device 600 may include a control circuit 602 for controlling the functionality of the device 600. The control circuit 602 may include one or more general purpose processors, special purpose processors, conventional processors, digital signal processors (DSPs), microprocessors, integrated circuits, a programmable logic device (PLD), application specific integrated circuits (ASICs), or the like. The control circuit 602 may perform signal coding, data processing, image processing, power control, input/output processing, or any other functionality that enables the device 602 to perform as one of the input devices of the load control system (e.g., load control system 100) described herein.

The control circuit 602 may be communicatively coupled to a memory 604 to store information in and/or retrieve information from the memory 604. The memory 604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 606 may be implemented as an external integrated circuit (IC) or as an internal circuit of the control circuit 602.

The input device 600 may include one or more communication circuits 608 that are in communication with the control circuit 602 for sending and/or receiving information as described herein. The communication circuit 608 may perform wireless and/or wired communications. The communication circuit 608 may be a wired communication circuit capable of communicating on a wired communication link. The wired communication link may include an Ethernet communication link, an RS-485 serial communication link, a 0-10 volt analog link, a Digital Addressable Lighting Interface (DALI) digital communication link, and/or another wired communication link. The communication circuit 608 may be configured to communicate via power lines (e.g., the power lines from which the input device 600 receives power) using a power line carrier (PLC) communication technique. The communication circuit 608 may be a wireless communication circuit including one or more RF transmitters, receivers, transceivers, or other communication modules capable of performing wireless communications.

Though a single communication circuit 608 may be illustrated, multiple communication circuits may be implemented in the input device 600. The input device 600 may include a communication circuit configured to communicate via one or more wired and/or wireless communication protocols and at least one other communication circuit configured to communicate via one or more other wired and/or wireless communication protocols. For example, a first communication circuit may be configured to communicate via a wired or wireless communication link, while another communication circuit may be capable of communicating on another wired or wireless communication link. The first communication circuit may be configured to communicate via a first wireless communication protocol on a network communication link and the second communication circuit may be configured to communicate via a second wireless communication protocol on a short-range communication link or a direct communication link.

The control circuit 602 may be in communication with one or more input circuits 614 from which input may be received. The input circuits 614 may be included in a user interface for receiving input from the user. For example, the input circuits 614 may include an actuator (e.g., one or more physical buttons) that may be actuated by a user to communicate user input or selections to the control circuit 602. The actuator may be actuated to put the control circuit 602 in an association mode and/or communicate association messages from the input device 600 or signal other information to the control circuit 602. The actuator may be actuated to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 602 of the device 600 may enter the association mode, transmit an association message, transmit control instructions, or perform other functionality in response to an actuation or input from the user on the touch sensitive surface.

The input circuits 614 may include a sensing circuit (e.g., a sensor). The sensor circuit may be an occupant sensing circuit, a light sensing circuit (e.g., an ambient light sensing circuit, a daylight sensing circuit, and/or a photo-sensing circuit), a temperature sensor circuit, a color temperature sensing circuit, a visible light sensing circuit (e.g., an image recording circuit, such as a camera), or another sensing circuit for receiving input (e.g., sensing an environmental characteristic in the environment of the input device 600). The control circuit 602 may receive information from the one or more input circuits 614 and process the information for performing functions as described herein.

The control circuit 602 may be in communication with one or more output sources 612. The output sources 612 may include one or more indicators (e.g., visible indicators, such as LEDs) for providing indications (e.g., feedback) to a user. The output sources 612 may include a display (e.g., a visible display) for providing information (e.g., feedback) to a user. The control circuit 602 and/or the display may generate a graphical user interface (GUI) generated via software for being displayed on the input device 600 (e.g., on the display of the input device 600).

Each hardware component within the device 600 may be powered by a power source 610. The power source 610 may include an AC power supply or DC power supply, for example. The power source 610 may generate a supply voltage $V_{CC}$ for powering the hardware components within the input device 600.

Figure 7:
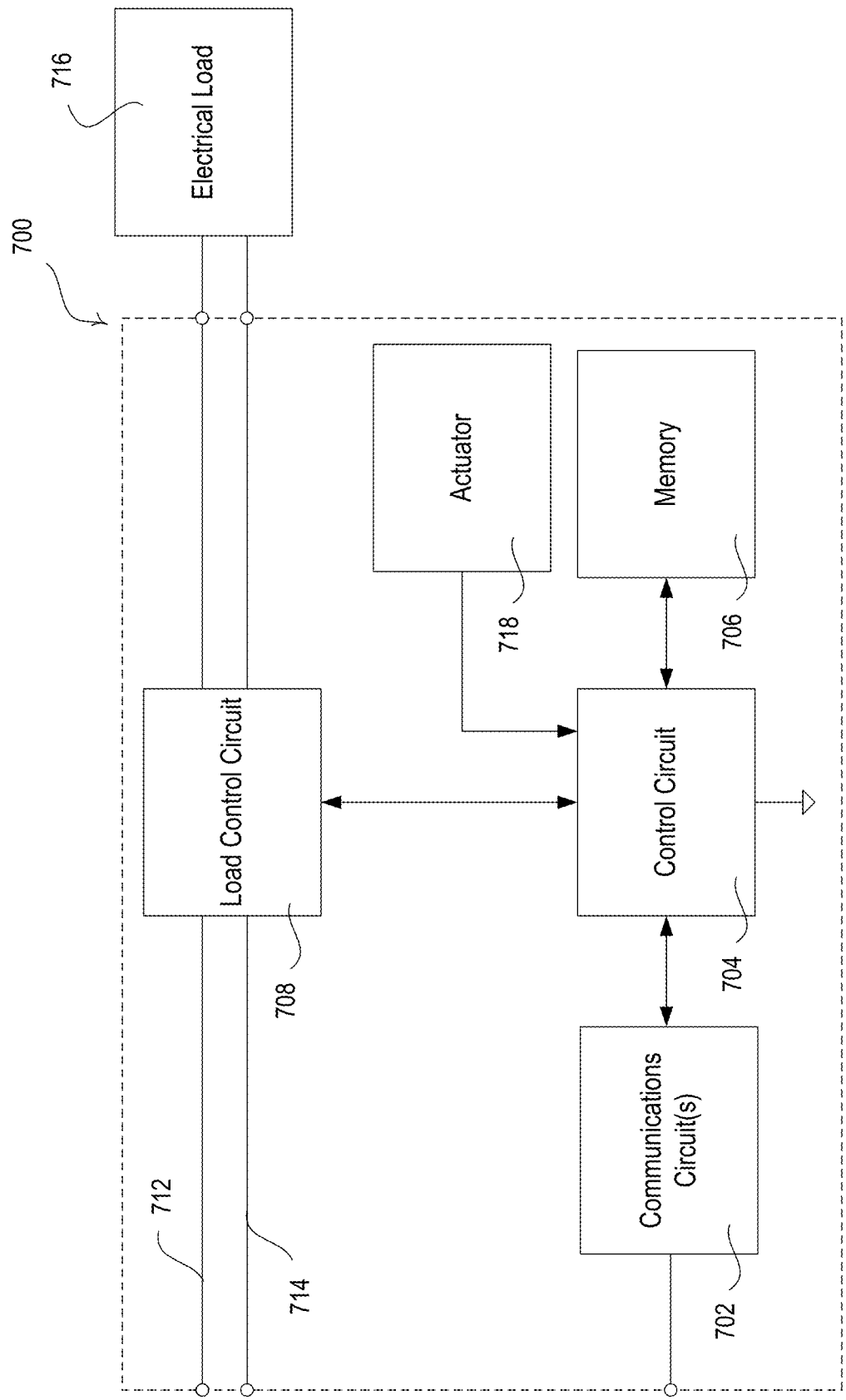
FIG. 7 is a block diagram of an example load control device.

FIG. 7 is a block diagram illustrating an example load control device, e.g., a load control device 700, as described herein. The load control device 700 may be a lighting control device, such as a dimmer switch, an electronic switch, an electronic ballast for lamps, an LED driver for LED light sources, or another lighting control device. The load control device 700 may be an AC plug-in load control device for controlling a plugged electrical load, a controllable electrical receptacle, a temperature control device (e.g., a thermostat), a motor drive unit for a motorized window treatment, a motor drive unit for a fan (e.g., ceiling fan), an audio device (e.g., a controllable speaker or playback device), an appliance, a security camera device, or other load control device.

The load control device 700 may include a communications circuit 702. The communications circuits 702 may include a receiver, an RF transceiver, or other communications module capable of performing wired and/or wireless communications via a communications link. The wired communication link may include an Ethernet communication link, an RS-485 serial communication link, a 0-10 volt analog link, a Digital Addressable Lighting Interface (DALI) digital communication link, and/or another wired communication link. Though a single communication circuit 702 may be illustrated, multiple communication circuits may be implemented in the load control device 700. The load control device 700 may include a communication circuit configured to communicate via one or more wired and/or wireless communication protocols and at least one other communication circuit configured to communicate via one or more other wired and/or wireless communication protocols. For example, a first communication circuit may be configured to communicate via a wired or wireless communication link, while another communication circuit may be capable of communicating on another wired or wireless communication link. The first communication circuit may be configured to communicate via a first wireless communication protocol on a network communication link and the second communication circuit may be configured to communicate via a second wireless communication protocol on a short-range communication link or a direct communication link.

The communications circuit 702 may be in communication with a control circuit 704. The control circuit 704 may include one or more general purpose processors, special purpose processors, conventional processors, digital signal processors (DSPs), microprocessors, integrated circuits, a programmable logic device (PLD), application specific integrated circuits (ASICs), or the like. The control circuit 704 may perform signal coding, data processing, power control, input/output processing, or any other functionality that enables the load control device 700 to perform as described herein.

The control circuit 704 may store information in and/or retrieve information from the memory 706. For example, the memory 706 may maintain a registry of associated control devices and/or configuration settings/configuration instructions for responding to triggering events or other control instructions. The memory 706 may include a non-removable memory and/or a removable memory. The load control circuit 708 may receive instructions from the control circuit 704 and may control the electrical load 716 based on the received instructions. The load control circuit 708 may send status feedback to the control circuit 704 regarding the status of the electrical load 716. The load control circuit 708 may receive power via the hot connection 712 and the neutral connection 714 and may provide an amount of power to the electrical load 716. The electrical load 716 may include any type of electrical load.

The control circuit 704 may be in communication with an actuator 718 (e.g., one or more buttons) that may be actuated by a user to communicate user selections to the control circuit 704. For example, the actuator 718 may be actuated to put the control circuit 704 in an association mode and/or communicate association messages from the load control device 700.

Although features and elements are described herein in particular combinations, each feature or element can be used alone or in any combination with the other features and elements. The methods described herein may be implemented in a computer program, software, instructions, or firmware stored on one or more non-transitory computer-readable media or other machine-readable media for execution by a computer or machine, or portion thereof. For example, the computer-readable or machine-readable media may be executed by a control circuit, such as a processor. Examples of computer-readable media or machine-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). The control circuit may access the computer program, software, instructions, or firmware stored on the computer-readable media or machine-readable media for being executed to cause the control circuit to operate as described herein, or to operate one or more devices as described herein.

What is claimed is:

1. A method comprising:
receiving predefined system configuration data, wherein the predefined system configuration data defines at least one zone, wherein each zone of the at least one zone is assigned a lighting zone purpose that indicates a lighting function of one or more lighting loads in the zone;
defining a scene configured to control the one or more lighting loads of the at least one zone in response to a triggering event, wherein the scene is defined by:
receiving a selection of a curated configuration option from a set of curated configuration options that each predefine different curated configuration settings for controlling the one or more lighting loads in each zone of the at least one zone; and
for each zone of the at least one zone, automatically determining, based at least on the selected curated configuration option and the lighting zone purpose of the one or more lighting loads of the zone, curated configuration settings for the scene that are configured to control the one or more lighting loads of the zone; and
transmitting the curated configuration settings for the scene to one or more lighting control devices configured to control the one or more lighting loads;
receiving an indication of the triggering event for enabling the scene; and
controlling, in response to the received indication of the triggering event, the one or more lighting loads in each zone of the at least one zone based on the curated configuration settings.

2. The method of claim 1, wherein the scene is further defined by modifying the curated configuration settings for the scene to generate manually-adjusted configuration settings.

3. The method of claim 2, wherein the modifying the curated configuration settings for the scene comprises:
displaying the curated configuration settings via a graphical user interface; and
receiving modifications to the curated configuration settings via the graphical user interface to generate the manually-adjusted configuration settings.

4. The method of claim 1, wherein each zone of the at least one zone is associated with a control type, wherein the automatically determining the curated configuration settings for the scene is further based on the control type of the one or more lighting loads in the zone.

5. The method of claim 1, wherein the automatically determining the curated configuration settings for the scene is further based on one or more of a location or an area type.

6. The method of claim 1, wherein the scene is a first scene, wherein the at least one zone includes a first zone, wherein the lighting zone purpose is a first lighting zone purpose, wherein the selection is a first selection of a first curated configuration option, wherein the curated configuration settings comprise first curated configuration settings, and wherein the triggering event is a first triggering event, the method further comprising:

defining a second scene configured to control a second zone and a third zone in response to a second triggering event, the second zone being assigned a second lighting zone purpose and the third zone being assigned a third lighting zone purpose, wherein the second scene is defined by:
receiving a second selection of a second curated configuration option from the set of curated configuration options; and
automatically determining second curated configuration settings for the second scene based at least on the second selection of the second curated configuration option, the second lighting zone purpose, and the third lighting zone purpose.

7. The method of claim 1, wherein the at least one zone comprises a first zone, wherein the lighting zone purpose of the first zone comprises a first lighting zone purpose, the method further comprising generating the predefined system configuration data by:
receiving an indication to create the first zone of the at least one zone;
displaying a plurality of lighting zone purposes via a graphical user interface;
receiving a selection of the first lighting zone purpose from the plurality of lighting zone purposes via the graphical user interface; and
associating the first lighting zone purpose with the first zone.

8. The method of claim 7, wherein the scene is further defined by:
receiving the indication of the triggering event to enable the scene;
receiving an indication of the at least one zone to be controlled by the scene; and
displaying the set of curated configuration options via the graphical user interface, wherein the selection of the curated configuration option is received via the graphical user interface.

9. The method of claim 1, further comprising configuring the at least one zone in a building, wherein the configuring the at least one zone comprises assigning the lighting zone purpose.

10. The method of claim 1, wherein the curated configuration settings for the scene comprise at least one of an intensity setting, a color setting, a vibrancy setting, a fade setting, or a delay setting.

11. The method of claim 1, wherein the triggering event is a button press or a sensor event.

12. The method of claim 1, wherein the lighting zone purpose is assigned to each zone of the at least one zone from a set of zone purposes.

13. A method comprising:
receiving predefined system configuration data, wherein the predefined system configuration data comprises an area in a building, wherein the area in the building comprises at least one zone, wherein each zone of the at least one zone is assigned a lighting zone purpose that indicates a lighting function of one or more lighting loads in the zone;
defining a scene configured to control the one or more lighting loads of at least one zone in the area in response to a triggering event, wherein the scene is defined by:
receiving a selection of a curated configuration option from a set of curated configuration options that each predefine different curated configuration settings for controlling the one or more lighting loads in each zone of the at least one zone;

for each zone of the at least one zone, automatically determining, based at least on the selected curated configuration option and the lighting zone purpose of the one or more lighting loads assigned to the zone received in the predefined system configuration data, curated configuration settings for the scene that are configured to control the one or more lighting loads of the zone; and storing control settings for the scene based at least on the curated configuration settings for the scene;

receiving an indication of the triggering event for enabling the scene; and controlling, in response to the received indication of the triggering event, the at least one zone according to the scene.

14. The method of claim 13, wherein the scene is further defined by receiving updates to the curated configuration settings for the scene, and wherein determining the control settings for the scene is further based on the received updates.

15. The method of claim 14, wherein the updates to the curated configuration settings for the scene are received via a graphical user interface.

16. The method of claim 13, wherein the scene is a first scene, wherein the at least one zone includes a first zone, wherein the lighting zone purpose is a first lighting zone purpose, wherein the selection is a first selection of a first curated configuration option, wherein the curated configuration settings comprise first curated configuration settings, and wherein the triggering event is a first triggering event, the method further comprising:

defining a second scene configured to control a second zone and a third zone in response to a second triggering event, the second zone being assigned a second lighting zone purpose and the third zone being assigned a third lighting zone purpose, wherein the second scene is defined by:

receiving a second selection of a second curated configuration option from the set of curated configuration options; and automatically determining second curated configuration settings for the second scene based at least on the second selection of the second curated configuration option, the second lighting zone purpose, and the third lighting zone purpose.

17. The method of claim 13, wherein the at least one zone comprises a first zone, wherein the lighting zone purpose of the first zone comprises a first lighting zone purpose, the method further comprising generating the predefined system configuration data by:

receiving an indication to create the first zone of the at least one zone;

displaying a plurality of lighting zone purposes via a graphical user interface;

receiving a selection of the first lighting zone purpose from the plurality of lighting zone purposes via the graphical user interface; and associating the first lighting zone purpose with the first zone.

18. The method of claim 17, wherein the scene is further defined by:

receiving the indication of the triggering event to enable the scene;

receiving an indication of the at least one zone to be controlled by the scene; and displaying the set of curated configuration options via the graphical user interface, wherein the selection of the curated configuration option is received via the graphical user interface.

19. A non-transitory computer-readable storage medium having computer executable instructions stored thereon that, when executed by a control circuit, cause the control circuit to:

receive predefined system configuration data, wherein the predefined system configuration data comprises a plurality of areas in a building, wherein each area of the plurality of areas in the building comprises at least one zone that comprises at least one lighting load controlled by a lighting control device, and wherein the predefined system configuration data indicates a zone purpose of each zone of the at least one zone that indicates a lighting function for the at least one lighting load in the zone;

define a scene configured to control the at least one zone in each area in response to a triggering event, wherein the instructions are configured to cause the control circuit to define the scene by being configured to cause the control circuit to:

receive a curated configuration option from a plurality of curated configuration options that each predefine different curated configuration settings for controlling each zone of the at least one zone in response to the triggering event;

identify, from the predefined system configuration data, a respective lighting zone purpose assigned to each zone of the at least one zone that indicates the lighting function for the at least one lighting load in the zone;

for each zone of the at least one zone, automatically determine, based at least on the curated configuration option and the respective lighting zone purpose of the zone, curated configuration settings for the scene that are configured to control the at least one lighting load in the zone; and store the curated configurations settings for controlling each zone of the at least one zone;

receive an indication of the triggering event for enabling the scene; and control, in response to the received indication of the triggering event, each zone of the at least one zone according to the scene.

20. The non-transitory computer-readable storage medium of claim 19, wherein the Instructions are further configured to cause the control circuit to:

receive the indication of the triggering event for enabling the scene; and control the at least one zone according to the scene.

21. The non-transitory computer-readable storage medium of claim 19, wherein the instructions are further configured to cause the control circuit to define the scene by being configured to receive updates to the curated configuration settings for the scene, and wherein the instructions are configured to cause the control circuit to determine the control settings for the scene based on the received updates.

22. The non-transitory computer-readable storage medium of claim 21, wherein the instructions are configured to cause the control circuit to receive the updates to the curated configuration settings for the scene via a graphical user interface.

23. The non-transitory computer-readable storage medium of claim 19, wherein the scene is a first scene, wherein the at least one zone includes a first zone, wherein the lighting zone purpose is a first lighting zone purpose, wherein the selection is a first selection of a first curated configuration option, wherein the curated configuration settings comprise first curated configuration settings, and wherein the triggering event is a first triggering event, wherein the instructions are configured to cause the control circuit to:
  define a second scene configured to control a second zone and a third zone in response to a second triggering event, the second zone being assigned a second lighting zone purpose and the third zone being assigned a third lighting zone purpose, wherein the instruction are configured to cause the control circuit to define the second scene by being configured to cause the control circuit to:
  receive a second selection of a second curated configuration option from the set of curated configuration options; and
  automatically determine second curated configuration settings for the second scene based at least on the second selection of the second curated configuration option, the second lighting zone purpose, and the third lighting zone purpose.

24. The non-transitory computer-readable storage medium of claim 19,
  wherein the at least one zone comprises a first zone, wherein the lighting zone purpose of the first zone comprises a first lighting zone purpose, and wherein the instructions are further configured to cause the control circuit to generate the predefined system configuration data by being configured to cause the control circuit to:
  receive an indication to create the first zone of the at least one zone;
  display a plurality of lighting zone purposes via a graphical user interface;
  receive a selection of the first lighting zone purpose from the plurality of lighting zone purposes via the graphical user interface; and
  associate the first lighting zone purpose with the first zone.

25. The non-transitory computer-readable storage medium of claim 24, wherein the instructions are further configured to cause the control circuit to define the scene by being configured to cause the control circuit to:
  receive the indication of the triggering event to enable the scene;
  receive an indication of the at least one zone to be controlled by the scene; and
  display the set of curated configuration options via the graphical user interface, wherein the instructions are configured to cause the control circuit to receive the selection of the curated configuration option via the graphical user interface.

* * * * *